United States Patent
Tsai et al.

(10) Patent No.: US 12,490,300 B2
(45) Date of Patent: Dec. 2, 2025

(54) CHANNELIZATION AND LBT FOR NR UNLICENSED BAND FROM 52.6 GHZ AND ABOVE

(71) Applicant: INTERDIGITAL PATENT HOLDINGS, INC., Wilmington, DE (US)

(72) Inventors: Allan Tsai, Boonton, NJ (US); Kyle Pan, Saint James, NY (US); Patrick Svedman, Stockholm (SE); Mohamed M. Awadin, Plymouth Meeting, PA (US); Yifan Li, Conshohocken, PA (US); Pascal Adjakple, Great Neck, NY (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 285 days.

(21) Appl. No.: 18/004,456

(22) PCT Filed: Jul. 7, 2021

(86) PCT No.: PCT/US2021/040671
§ 371 (c)(1),
(2) Date: Jan. 6, 2023

(87) PCT Pub. No.: WO2022/011000
PCT Pub. Date: Jan. 13, 2022

(65) Prior Publication Data
US 2024/0179737 A1    May 30, 2024

Related U.S. Application Data

(60) Provisional application No. 63/048,854, filed on Jul. 7, 2020.

(51) Int. Cl.
*H04W 74/0808* (2024.01)
*H04L 5/00* (2006.01)
*H04W 16/14* (2009.01)

(52) U.S. Cl.
CPC ......... *H04W 74/0808* (2013.01); *H04L 5/001* (2013.01); *H04W 16/14* (2013.01)

(58) Field of Classification Search
CPC ............ H04W 74/0808; H04W 16/14; H04W 72/0453; H04L 5/001; H04L 5/0037; H04L 27/0006
(Continued)

(56) References Cited

U.S. PATENT DOCUMENTS

| | | | |
|---|---|---|---|
| 2014/0044085 A1* | 2/2014 | Hong | H04L 5/0053 370/329 |
| 2019/0230706 A1* | 7/2019 | Li | H04W 88/08 |

(Continued)

FOREIGN PATENT DOCUMENTS

WO    2020/088189 A1    5/2020

OTHER PUBLICATIONS

LG Electronics, "Consideration on multi-carrier operation for NR above 52.6 GHz," 3GPP Draft; R1-2004040, 3rd Generation Partnership Project (3GPP). Mobile Competence Centre. 650, Route Des L. Ucio Les, F-06921 Sophia-Antipolis Cedex, France, vol. RAN WG1, No. e-Meeting, May 25, 2020-Jun. 5, 2020, May 16, 2020.

(Continued)

*Primary Examiner* — Candal Elpenord
*Assistant Examiner* — Syed M Bokhari
(74) *Attorney, Agent, or Firm* — Flaster Greenberg P.C.

(57) ABSTRACT

Methods, systems, and devices may assist in channelization and LBT for NR unlicensed band. This may apply to NR-U from 52.6 GHz to 71 GHz and above. In an example, a (Continued)

method may include configuring listen before talk (LBT) bandwidth (BW) and channel occupation time (COT) sharing schemes when co-exist other radio access technology's (RAT'S) channel BW for NR-U from 52.6 to 71 GHz and above; and when LBT or a resource block (RB) set BW is set to equal to each component carrier (CC) BW Nor transmission BW, performing LBT for each CC, primary cell (PCell), primary secondary cell (PSCell), or a scheduling secondary cell (SCell) can co-schedule LBT results for other CC.

29 Claims, 29 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0349815 A1* | 11/2019 | Tiirola | H04W 72/12 |
| 2020/0169377 A1* | 5/2020 | Lee | H04L 5/0051 |
| 2020/0267633 A1* | 8/2020 | Bendlin | H04W 16/14 |
| 2021/0045076 A1* | 2/2021 | Tomeba | H04W 56/001 |
| 2021/0105812 A1* | 4/2021 | Rastegardoost | H04W 74/0808 |

OTHER PUBLICATIONS

3$^{rd}$ Generation Partnership Project; Technical Specification Group Radio Access Network; "Study on Scenarios and Requirements for Next Generation Access Technologies", (Release 14), 3GPP TR 38.913 V14.3.0, Jun. 2017, 39 pages.

3$^{rd}$ Generation Partnership Project; Technical Specification Group Radio Access Network; NR; "User Equipment (UE) Radio Transmission and Reception, Part 1: Range 1 Standalone", (Release 16), 3GPP TS 38.101-1 V16.2.0, Dec. 2019, 310 pages.

3$^{rd}$ Generation Partnership Project; Technical Specification Group Radio Access Network; NR; "User Equipment (UE) Radio Transmission and Reception, Part 2: Range 2 Standalone", (Release 16), 3GPP TS 38.101-2 V16.2.0, Dec. 2019, 157 pages.

3$^{rd}$ Generation Partnership Project; Technical Specification Group Radio Access Network; NR; "User Equipment (UE) Radio Access Capabilities", (Release 15), 3GPP TS 38.306 V15.3.0, Sep. 2018, 31 pages.

* cited by examiner

CHANNELIZATION AND LBT FOR NR UNLICENSED BAND FROM 52.6 GHZ AND ABOVE

CROSS-REFERENCE TO RELATED APPLICATIONS

This application is the National Stage Application of International Patent Application No. PCT/US2021/040671, filed Jul. 7, 2021, which claims the benefit of U.S. Provisional Patent Application No. 63/048,854, filed on Jul. 7, 2020, entitled "Channelization And LBT For NR Unlicensed Band From 52.6 GHz And Above," the contents of both are hereby incorporated by reference herein.

BACKGROUND

Release-16 NR-U

In Release-16 New Radio Unlicensed (NR-U), the supported numerology (i.e. SCS) can be set as 15, 30 or 60 kHz in frequency range 1 (FR1). This is because 802.11 channels can be 20 MHz, 40 MHz, 80 MHz, and 160 MHz in sub-7 GHz. Therefore, the listen before talk (LBT) bandwidth is set to 20 MHz in Release-16 NR-U. Based on the minimum LBT bandwidth that must be supported, the DL initial BWP is nominally 20 MHz for Rel-16 NR-U. The maximum supported channel bandwidth is set to 100 MHz. The UE channel bandwidth (or an activated BWP) can be set as an integer multiple of LBT bandwidth (i.e. 20 MHz) in frequency range 1 (FR1) as shown in Table 1. For instance, for SCS=30 kHz, the total allocated PRB numbers for 20 MHz, 40 MHz and 80 MHz bandwidth is equal to 48, 102, and 214, respectively.

TABLE 1

Support numerology/SCS in Release-16 NR-U

| Numerology | $\mu = 0$ | $\mu = 1$ | $\mu = 2$ |
|---|---|---|---|
| Subcarrier spacing (SCS) [KHz] | 15 | 30 | 60 |
| Sampling Frequency [MHz] | 61.44 | 122.88 | 245.76 |
| Maximum FFT Size | 4096 | 4096 | 4096 |
| Maximum number of PRBs | 270 | 273 | 264 |
| Maximum allocation bandwidth [MHz] | 48.6 | 98.28 | 190.08 |
| Maximum channel bandwidth [MHz] | 50 | 100 | 200 |

In Rel-16, DCI format 2_0 introduce notifying the COT duration, available RB set, and search space group switching. The size of DCI format 2_0 is configurable by higher layers up to 128 bits. The following information is transmitted by means of the DCI format 2_0 with CRC scrambled by SFI-RNTI:
 Slot format indicator 1, Slot format indicator 2, . . . , Slot format indicator N.
 If the higher layer parameter availableRB-SetPerCell-r16 is configured,
  Available RB set Indicator 1, Available RB set Indicator 2, . . . , Available RB set Indicator N1,
 If the higher layer parameter COT-DurationPerCell-r16 is configured
  COT duration indicator 1, COT duration indicator 2, . . . , COT duration indicator N2.
 If the higher layer parameter searchSpaceSwitchTrigger-r16 is configured
  Monitoring group flag 1, Monitoring group flag 2, . . . , Monitoring group flag [M].

In Rel-16 NR-U, the PRBs allocated by frequencyDomainResources in the CORESET configuration are confined within one of LBT bandwidths within the BWP corresponding to the CORESET. In this way, a PDCCH is confined within an LBT bandwidth to avoid partial puncturing of a DCI. A UE can stop monitoring PDCCH search spaces on LBT bandwidth(s) not available after acquiring the knowledge of transmitted LBT bandwidth(s) from GC-PDCCH. Within the search space set configuration associated with the CORESET, each of the one or more monitoring locations in the frequency domain corresponds to (and is confined within) an LBT bandwidth and has a frequency domain resource allocation pattern that is replicated from the pattern configured in the CORESET. In this way, CORESET parameters other than frequency domain resource allocation pattern is identical for each of the one or more monitoring locations in the frequency domain.

802.11ad and 802.11ay

Wireless Gigabit—WiGig (IEEE 802.11ad) is a technology used to enable a close-range wireless connectivity of up to 6.75 Gbps. The IEEE 802.11ad physical layer uses 2.16 GHz-width channels that theoretically provide data rate up to 6.76 Gbps per single channel. WiGig signals are operating at the 60 GHz frequency band (57-66 GHz) which is regulated slightly differently in various parts of the world. To compensate for the path loss, the IEEE 802.11ad device uses high gain antenna arrays. WiGig allows the use of four wide channels, each channel about 2.16 GHz wide, can support OFDM (for longer distances & higher data rates) as well as Single carrier (for low power handheld devices) modulation schemes. With such wide channeling, it enables data rates up to 3 times faster than today's Wi-Fi speeds.

IEEE 802.11ay, is an enhancement specification of 802.11ad. The band allocated to unlicensed use around 60 GHz has approximately 14 GHz of bandwidth, which is divided into channels of 2.16, 4.32, 6.48, and 8.64 GHz bandwidth. The channel bandwidths of 2.16 and 4.32 GHz are mandatory supported. The channel center frequencies for the 2.16 GHz channels are: 58.32, 60.48, 62.64, 64.80, 66.96, and 69.12 GHz for channel numbers 1 through 6, respectively as shown in FIG. 1. Unlike IEEE 802.11 ad, which only allows for single (2.16 GHz) channel transmission, 802.11ay includes mechanisms for channel bonding and aggregation. In this way, 802.11ay allows channel access over multiple channels. When using multiple channels, an access point (AP) can simultaneously transmit to multiple stations (STAs) allocated to different channels individually. In channel bonding, a single waveform covers at least two contiguous 2.16 GHz channels, whereas channel aggregation has a separate waveform for each aggregated channel. IEEE 802.11ay mandates that Enhanced Directional Multi Gigabit (EDMG) stations (STA)s must support operation in 2.16 GHz channels as well as channel bonding of two 2.16 GHz channels. Channel bonding usually refers to the merging of multiple contiguous channels into one wideband channel, and there is no channel spacing (or guardband) among multiple channels, which can be used as a whole band to form a single (wider) channel as illustrated in FIG. 2A. In contrast, channel aggregation is often used as the combination of two or more contiguous or non-contiguous channels, and there exists channel spacing or guardband between these aggregated channels no matter of contiguous or non-contiguous channels. In 802.11ay, channel aggregation of two 2.16 GHz or two 4.32 GHz (contiguous or non-contiguous) channels as illustrated in FIG. 2 (b) and aggregation of three or four 2.16 GHz channels are optional. Multi-channel operations can significantly enhance channel utilization efficiency.

In 802.11ay, FFT size of 512 together with SCS of 5.15625 MHz is used to achieve channel bandwidth of 2.16 GHz, which can be extended with channel bonding up to maximum contiguous bandwidth of 4.32 GHz. The 802.11ay sampling rate can be expressed as $512 \times N_{CB} \times 5.15625$ MHz, where $N_{CB}=1, 2$. The sampling frequency for 802.11ay must be greater than 5.28 GHz. 802.11ay supports high QAM modulation such as 64 QAM modulation, so the sampling bits per second (SBPS) requirement is up to 42.24 Gsbps (e.g. 42.24 Gsbps=8 bits/sample and sampling rate is equal to 5.28 giga samples per second). This kind of high sampling rate and high bits per sample impose a design challenge for WiFi 802.11 ad/ay. Therefore, NR-U from 52.6 to 71 GHz and above needs to consider the sampling strategies.

The regulatory requirement for 802.11ad channel is stipulated as follows: the spectrum mask of 892.11ad remains at 0 dBr till +/−0.94 GHz and the first breakpoints at −20 dBr occurred +/−1.2 GHz for both OFDM and Single Carrier modulations. The maximum permitted transmitter power varies by country, but in general +10 dBm can be taken as a practical limit.

NR Channel BW, Guardband and Channel Aggregation

In NR, the relationship between the channel bandwidth, the guardband and the maximum transmission bandwidth configuration is shown in FIG. 3. The UE channel bandwidth supports a single NR RF carrier in the uplink or downlink at the UE. In FIG. 3, the active resource block is determined by network (e.g. gNB) for actual resources for transmission (e.g. transmission BW). In practice, the maximum transmission BW is equal to the transmission BW in configuration.

The value of guardband varies with the supported SCS for a given channel bandwidth. For example, when the channel bandwidth is equal to 100 MHz. the (minimum) guardband is equal to 2450 kHz when SCS=60 kHz, and the guardband is equal to 2420 kHz when SCS=120 kHz, respectively as shown in Table 3 [4] ([4] refers to 3GPP TS 38.101-2 User Equipment (UE) radio transmission and reception; Part 2: Range 2 Standalone (Release-16), V16.2.0). The minimum guardbands have been calculated using the following equation:

$$BW_{GB} = \frac{(BW_{channel}[KHz] - N_{RB} \times SCS \times 12 - SCS)}{2} \quad \text{(Eq. 1)}$$

where $N_{RB}$ are given from Table 2 [4]. Note, in Eq.1 the unit of $BW_{channel}$ and SCS are based on KHz.

TABLE 2

| UE channel bandwidth, transmission bandwidth and SCS (KHz) in FR2. | | | | |
|---|---|---|---|---|
| SCS (kHz) | 50 MHz $N_{RB}$ | 100 MHz $N_{RB}$ | 200 MHz $N_{RB}$ | 400 MHz $N_{RB}$ |
| 60 | 66 | 132 | 264 | N.A |
| 120 | 32 | 66 | 132 | 264 |

TABLE 3

| Minimum guardband for each UE channel bandwidth and SCS (KHz) in FR2. | | | | |
|---|---|---|---|---|
| SCS (kHz) | 50 MHZ | 100 MHz | 200 MHz | 400 MHz |
| 60 | 1210 | 2450 | 4930 | N.A |
| 120 | 1900 | 2420 | 4900 | 9860 |

In NR, for a given channel bandwidth $BW_{channel}$, the number of available resource blocks (i.e. $N_{RB}$) are proportional decreased by half or more than half when the subcarrier spacing (SCS) doubles. For example, from Table 2, for the $BW_{channel}=100$ MHz (e.g. 100000 KHz), $N_{RB}=132$ when SCS=60 kHz and $N_{RB}=66$ when SCS=120 kHz. Four major types of carrier aggregation have been defined in 3GPP to meet different operator's spectrum scenarios.

Intra-band contiguous carrier aggregation
Intra-band non-contiguous carrier aggregation
Inter-band contiguous carrier aggregation
Inter-band non-contiguous carrier aggregation For intra-band contiguous carrier aggregation with two or more component carriers, the nominal channel spacing between two adjacent NR component carriers is defined as the following:

For example, in frequency range 2 (FR2) [4], for NR operating bands with a 60 kHz channel raster:

Nominal channel spacing =

$$\left[ \frac{BW_{channel(1)} + BW_{channel(2)} - 2|GB_{channel(1)} - GB_{channel(2)}|}{2 \times (0.06 \times 2^n)} \right] 0.06 \times 2^n,$$

where $n=\mu_0-2$ and $\mu_0=\max\{\mu_{channel(1)}, \mu_{channel(2)}\}$

For intra-band contiguous CA, UE's CA bandwidth class is defined according to their number of CCs supported and their Aggregated Transmission Bandwidth corresponding to Number of aggregated resource block ($N_{RB}$).

This background information is provided to reveal information believed by the applicant to be of possible relevance. No admission is necessarily intended, nor should be construed, that any of the preceding information constitutes prior art.

SUMMARY

Disclosed herein are methods, systems, and devices that may assist in channelization and LBT for NR unlicensed band. For example, this may apply to NR-U from 52.6 GHz to 71 GHz and above.

In an example, channelization methods and guardband configuration may be for (intra-band) carrier aggregation and the aggregated channel bandwidth are aligned with integer multiples of other RAT's channel bandwidth B (e.g. 2.16) GHz. Also, in an example, channelization methods and guardband configuration may be (intra-band) carrier aggregation and reused legacy NR channel BW and the aggregated channel bandwidth are not aligned with integer multiples of other RAT's channel bandwidth B (e.g. 2.16) GHz.

In another example, disclosed herein are LBT and COT sharing schemes when other RAT's channel BW (e.g. B) is integer multiples of the RB set size e.g., the bandwidth of LBT for NR-U from 52.6 to 71 GHz and above. Also, in another example, disclosed herein are LBT and COT sharing schemes when other RAT's channel BW is (almost) equal to the RB set size for NR-U from 52.6 GHz to 71 GHz. The (almost equal to B) BW $\tilde{B}$ means the maximum supported channel bandwidth within B.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION STATEMENT

Statement 1

Figure 1:
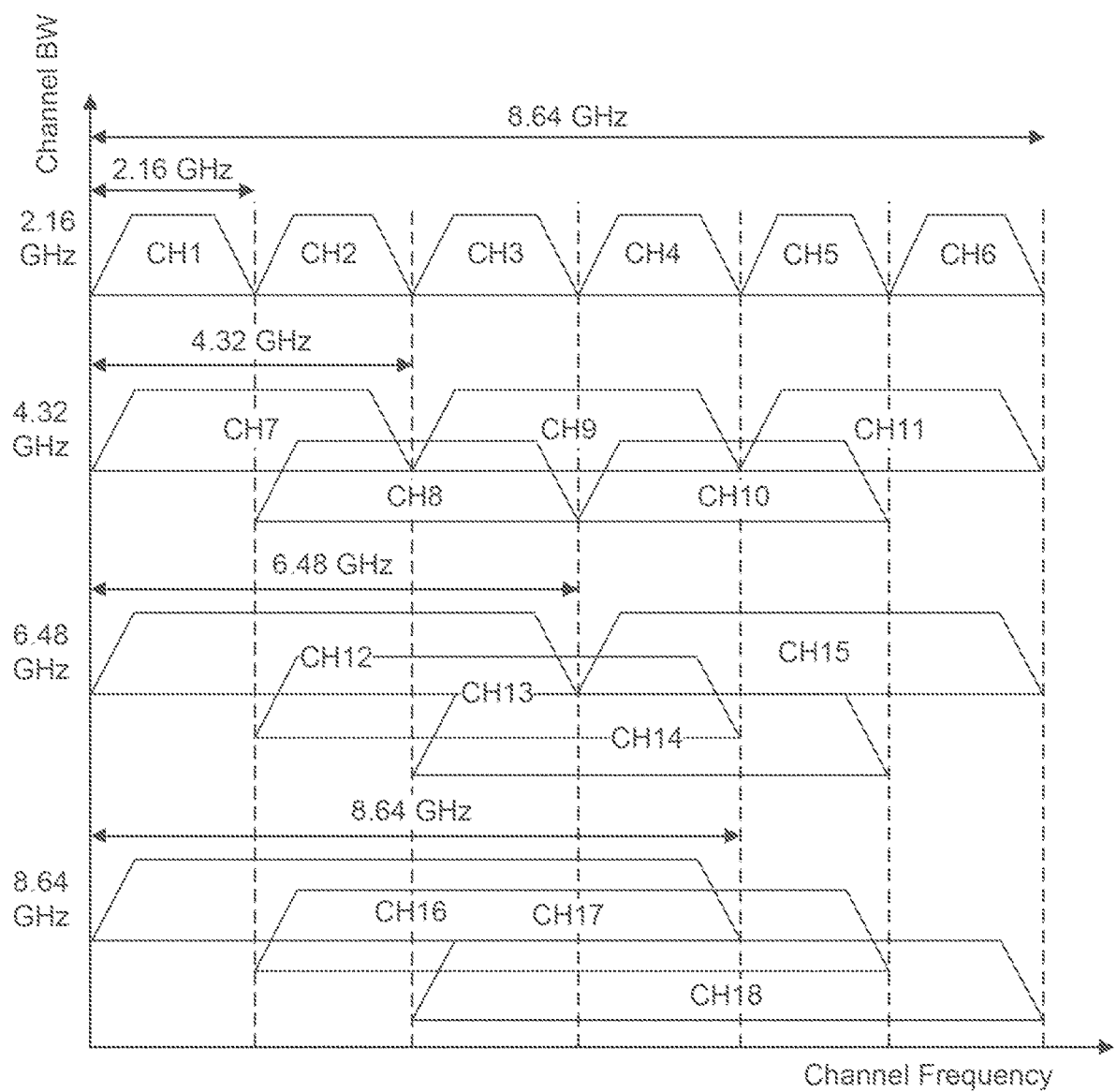
FIG. 1 illustrates an exemplary 802.11ay channelization scheme.
Figure 2A:
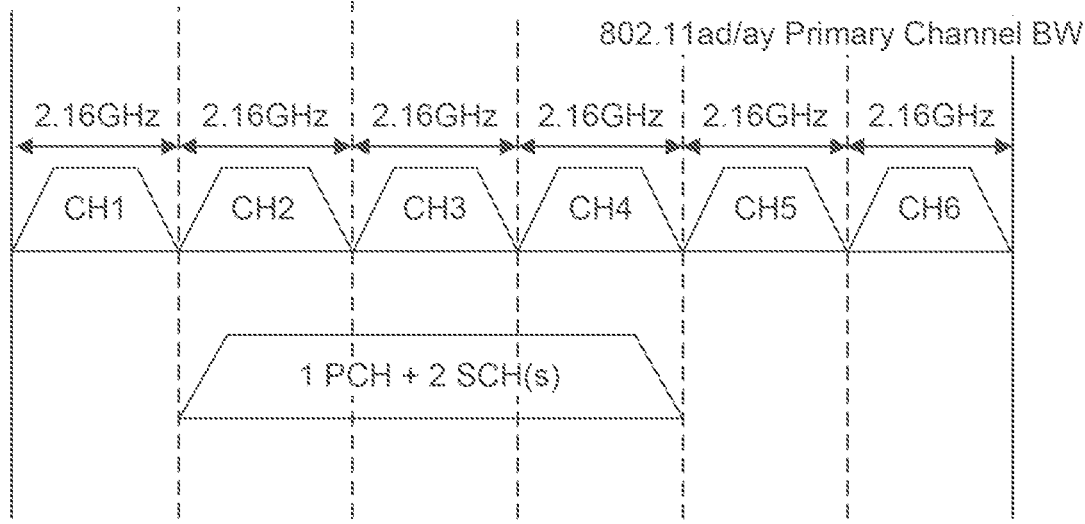
FIG. 2A illustrates an exemplary 802.11ay multi-channel allocation channel bonding.
Figure 2B:
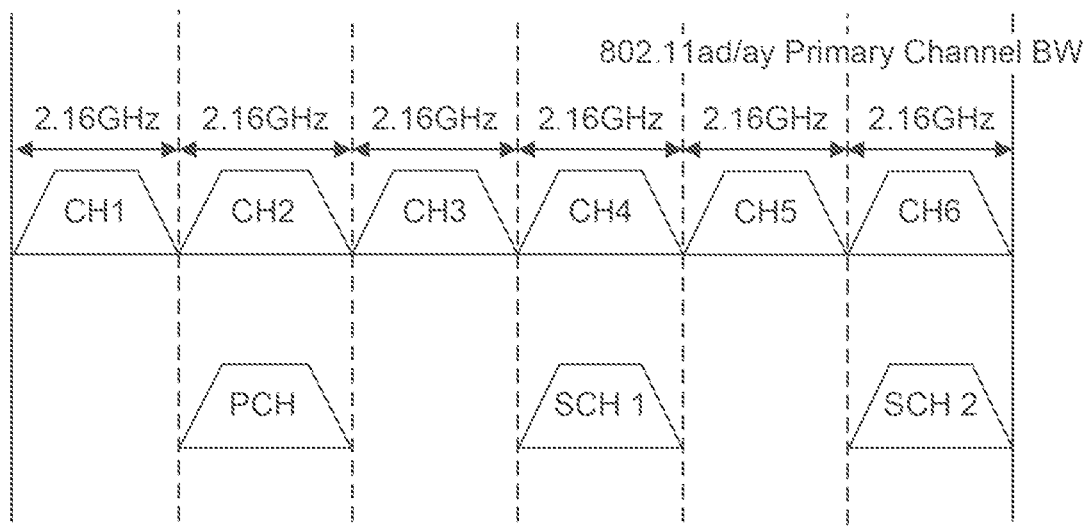
FIG. 2B illustrates an exemplary 802.11ay multi-channel allocation channel aggregation with primary channel (PCH)

The supported channel bandwidth can be {400, 800, 1600, 3200, . . . } MHz for NR from 52.6 GHz to 71 GHz. The calculation of NR channel bandwidth is based on the maximum Fast Fourier Transform (FFT) size 4096 (same as Rel-15/16) with the scalable subcarriers spacing {120, 240, 480, 960, 1920, . . . } KHz, respectively. However, WiFi 802.11 ad/ay channel bandwidth can be integer multiples of 2.16 GHz (e.g. 2.16 GHz, 4.32 GHz, 6.48 GHz and 8.64 GHz) and it is not the typical channel bandwidth aligned with the legacy channel bandwidth used in NR. Whether the LBT bandwidth B (e.g. B=2.16) GHz is adopted for NR Unlicensed (NR-U) LBT operation from 52.6 GHz to 71 GHz or not, the channelization methods need to be addressed for supporting NR-U co-existence with other RAT (e.g. 802.11 ad/ay) from 52.6 to 71 GHz to meet regulatory requirements, achieve better spectral utilization and reduce co-channel interference as there should be methods for the device to identify situations where channels of NR RAT versus other RAT (e.g. 802.11) overlaps.

Disclosed in more detail herein are channelization methods and guardband configuration for 1) (intra-band) carrier aggregation and aggregated channel bandwidth that may be aligned with integer multiples of other RAT's channel bandwidth B (e.g. 2.16) GHz; or 2) (intra-band) carrier aggregation and reused legacy NR channel BW and aggregated channel bandwidth that are not aligned with integer multiples of other RAT's channel bandwidth B (e.g. 2.16) GHz.

Statement 2

In Rel-16 NR-U, LBT can be performed in units of 20 MHz. Furthermore, LBT can be performed for a single carrier with bandwidth greater than 20 MHz, e.g., integer multiples of 20 MHz. In other words, the channel bandwidth can be integer multiples of 20 MHz in Rel-16 NR-U. This condition can be satisfied for the supported numerologies (e.g., SCS=15 KHz, 30 KHz and 60 KHz) in frequency range 1 (FR1). However, assuming LBT channel bandwidth of 2.16 GHz as in WiFi 802.11 ad/ay, this condition of channel bandwidth being integer multiple of LBT channel bandwidth cannot be met for some supported numerologies like SCS=120 KHz with maximum $BW_{channel}$=400 MHz, 240 KHz with maximum $BW_{channel}$=800 MHz and 480 KHz with maximum $BW_{channel}$=1600 MHz.

If NR-U from 52.6 GHz to 71 GHz and above allows the smaller channel bandwidth (e.g. 400 MHz, 800 MHz, 1600 MHz) than the WiFi 802.11 ad/ay nominal channel bandwidth 2.16 GHz then the LBT methods discussed in Rel-16 NR-U man not be directly applied for this condition. More specific, the minimum supported channel BW is 20 MHz and the LBT BW is defined 20 MHz in Rel-16 NR-U.

equal to B) BW $\tilde{B}$ means the maximum supported channel bandwidth within B.

Channelization Details

Channelization Methods for NR-U from 52.6 GHz to 71 GHz and Above

The (minimum) channel bandwidth of 802.11 ad/ay is equal to 2.16 GHz. The LBT bandwidth for NR-U from 52.6 GHz to 71 GHz band may be dependent on following factors: 1) the WiFi 802.11 ad/ay channel BW B=2.16 GHz or the bandwidth occupied by the WiFi 802.11ad/ay channel; or 2) supported NR channel BW with numerologies from 52.6 GHz to 71 GHz and above.

NR from 52.6 GHz and above should support a generalized scalable numerology (SCS) as frequency range 1, FR1 (sub 7 GHz) and frequency range 2, FR2 (24-52.6 GHz) defined in Rel-15 and 16. The scalable SCS in NR can be expressed as a scalable subcarrier spacing factor as $2^\mu \Delta f$, where $\Delta f$=15 kHz is the minimum subcarrier spacing used in NR frequency range 1 (e.g., FR1) with $\mu$=0,1,2 and FR2 with $\mu$=3,4, correspondingly. Another factor for determining the supported SCS for NR from 52.6 GHz to 71 GHz is the phase noise (PN) especially for higher quadrature modulation (QAM) like 64 and 256 QAM. In practice, larger SCS can mitigate PN and improve the demodulation performance. Hence, the subcarrier spacing for NR from 52.6 GHz to 71 GHz and above may consider to be enlarged compared to the supported SCS in FR1 and FR2 band. Based on the legacy supported channel bandwidth in FR1 and FR2, derive the possible supported numerologies with corresponding SCS and channel bandwidth (BW) in 52.6-71 GHz frequency bands are shown in Table 4:

TABLE 4

Possible supported numerologies for NR from 52.6 GHz to 71 GHz.

| Numerology | $\mu$ = 3 | $\mu$ = 4 | $\mu$ = 5 | $\mu$ = 6 | $\mu$ = 7 | $\mu$ = 8 |
|---|---|---|---|---|---|---|
| Subcarrier spacing (SCS) [KHz] | 120 | 240 | 480 | 960 | 1920 | 3840 |
| Sampling Frequency | 491.52 | 983.04 | 1966.08 | 3932.16 | 7864.32 | 15728.64 |
| Maximum FFT size | 4096 | 4096 | 4096 | 4096 | 4096 | 4096 |
| Maximum number of PRBs: $N_{RB}$ | 264 | 264 | 264 | 264 | 264 | 264 |
| Slot duration [us] | 125 | 62.5 | 31.25 | 15.625 | 7.8125 | 3.90625 |
| Maximum allocation bandwidth/Transmission BW [MHz] | 380.16 | 760.32 | 1520.64 | 3041.28 | 6082.56 | 12165.12 |
| Maximum $BW_{channel}$ [MHz] | 400 | 800 | 1600 | 3200 | 6400 | 12800 |

However, the channel BW of other RAT B (e.g., B=2.16 GHz) is wider than those considered NR-U channel BW (e.g. 100 MHz, 200 MHz, 400 MHz, 800 MHz, 1600 MHz) from 52.6 GHz to 71 GHz. Therefore, the LBT subband indication and channel occupation time (COT) sharing methods need to be addressed when the smaller channel BW for NR-U from 52.6 GHz to 71 GHz and above is smaller than other RAT (e.g. 802.11 ad/ay) channel BW B (e.g., B=2.16 GHz).

Disclosed in more detail herein are LBT and COT sharing schemes when other RAT's channel BW (e.g. B) is integer multiples of the RB set size e.g., the bandwidth of LBT for NR-U from 52.6 to 71 GHz and above.

other RAT's channel BW is (almost) equal to the RB set size for NR-U from 52.6 GHz to 71 GHz. The (almost However, supporting larger channel bandwidth may also reduce the coverage. This is because the thermal noise power is increased with the factor 10 log($BW_{channel}$) dB. For the numerology $\mu$=3, 4, and 5, the corresponding SCS is equal to 120 KHz, 240 KHz and 480 KHz, respectively. If instead a smaller channel BW is considered, coverage can be better compared to if a larger channel BW is used. For a smaller channel BW, SCS equal to 120, 240, and 480 KHz could also be used, assuming a fixed maximum FFT size. However, the maximum channel bandwidth that can be supported for the numerology $\mu$=3, 4, and 5 which their maximum supported channel BW ($BW_{channel}$) shown in Table 4 are less the LBT bandwidth, e.g., B=2.16 GHz.

In Rel-16 NR-U, three kind of operations with carrier aggregation (CA) were discussed. The first one is carrier aggregation between licensed band NR primary cell (PCell) and NR-U secondary cell (SCell), the second one is dual connectivity (DC) between licensed band LTE (PCell) and NR-U primary secondary cell group (PSCG), and the third one is for standalone NR-U. Rel-16 NR-U supports a mode of operation where for a carrier and at least for intra-band CA on serving cells on unlicensed bands, the DL and UL channels/signals can only be operated with the same numerology. In addition, wide band operation (in integer multiples of 20 MHz) for DL and UL for NR-U is supported both with multiple aggregated serving cells, and with one serving cell with bandwidth>20 MHz.

Similarly, adoption of carrier aggregation can be supported for NR-U from 52.6 GHz to 71 GHz and above. A UE may simultaneously receive or transmit on one or multiple component carriers (CCs) depending on its capabilities. Here, carrier aggregation (CA) refers to two or more component carriers (CCs) are aggregated and CA is supported for both (intra-band or inter-band) contiguous and non-contiguous CCs for NR-U from 52.6 GHz to 71 GHz and above. Support of both contiguous and non-contiguous aggregated CCs may be analog to the scenario where the channel access opportunities do not have to be contiguous but may be dispersed from 52.6 GHz to 71 GHz and above. Furthermore, CA benefits the adoption of smaller numerologies like µ=3, 4, and 5 for NR-U channelization from 52.6 GHz to 71 GHz and above.

Disclosed herein are multiple options for NR-U channelization from 52.6 GHz to 71 GHz and above. An Option 1: adoption of (intra-band) carrier aggregation and the aggregated channel bandwidth aligns with integer multiples of B (e.g. 2.16) GHz. An Option 2: adoption of (intra-band) carrier aggregation, reused legacy channel BW and the aggregated channel bandwidth does not align with integer multiples of B (e.g. 2.16) GHz.

Adoption of Carrier Aggregation and the Aggregated Channel Bandwidth Aligns with Integer Multiples of B The disclosed subject matter corresponds to adopting multiple component carriers (CCs). The number of aggregated component carriers (or cells) could be dependent on the UE's capability. Disclosed herein is that the CC's channel bandwidth (e.g., <B or ≥B) can be with carrier aggregation and the aggregated channel bandwidth can be with integer multiples of B' (e.g. 2.16 GHz) to consider co-existing with other RAT (e.g., 802.11 ad/ay).

A UE can be configured with one cell group or multiple cell groups and allowed to transmit and receive in the same cell groups simultaneously. Each cell/component carrier in a cell group can be configured for TDD or DL/UL cell. The slot format can be indicated by DCI format 2_0 as Rel-16 NR-U. The slot format can be independently indicated for each CCs/cells in a cell group. For each cell group, the aggregated channel bandwidth can be integer multiples of $$B' = \frac{B}{M},$$

where M is a positive integer. It can allow one or multiple aggregated cells (or component carriers) and each channel bandwidth can be equal integer multiples of $$BW_{channel} = B' = \frac{B}{M},$$

where M is a positive integer. The smallest numerology for CA is µ=3 (e.g., SCS=120 kHz) for NR-U from 52.6 GHz to 71 GHz and above.

For example, the supported numerologies and channel BW for the aggregated channel BW being integer multiples of B are shown in Table 5. Unlike the channel BW shown in Table 4, where the disclosed channel BW $BW_{channel}$ given in Table 5 is aligned with integer multiples of B.

TABLE 5

The supported numerologies and channel BW for NR from 52.6 GHz to 71 GHz with considering the aggregated channel BW can be integer multiples of B.

| Numerology | µ = 3 | µ = 4 | µ = 5 | µ = 6 | µ = 7 | µ = 8 |
|---|---|---|---|---|---|---|
| Subcarrier spacing (SCS) [kHz] | 120 | 240 | 480 | 960 | 1920 | 3840 |
| Sampling Frequency | 491.52 | 983.04 | 1966.08 | 3932.16 | 7864.32 | 15728.64 |
| Maximum FFT size | 4096 | 4096 | 4096 | 4096 | 4096 | 4096 |
| Maximum number of PRBs: $N_{RB}$ | 285 | 285 | 285 | 285 | 285 | 285 |
| Slot duration [us] | 125 | 62.5 | 31.25 | 15.625 | 7.8125 | 3.90625 |
| Maximum allocation bandwidth//Transmission BW [MHz] | 410.4 | 820.8 | 1641.6 | 3283.2 | 6566.4 | 13121.8 |
| Maximum $BW_{channel}$ [MHz] | 432 | 864 | 1728 | 3456 | 6912 | 12800 |

Figure 5A:
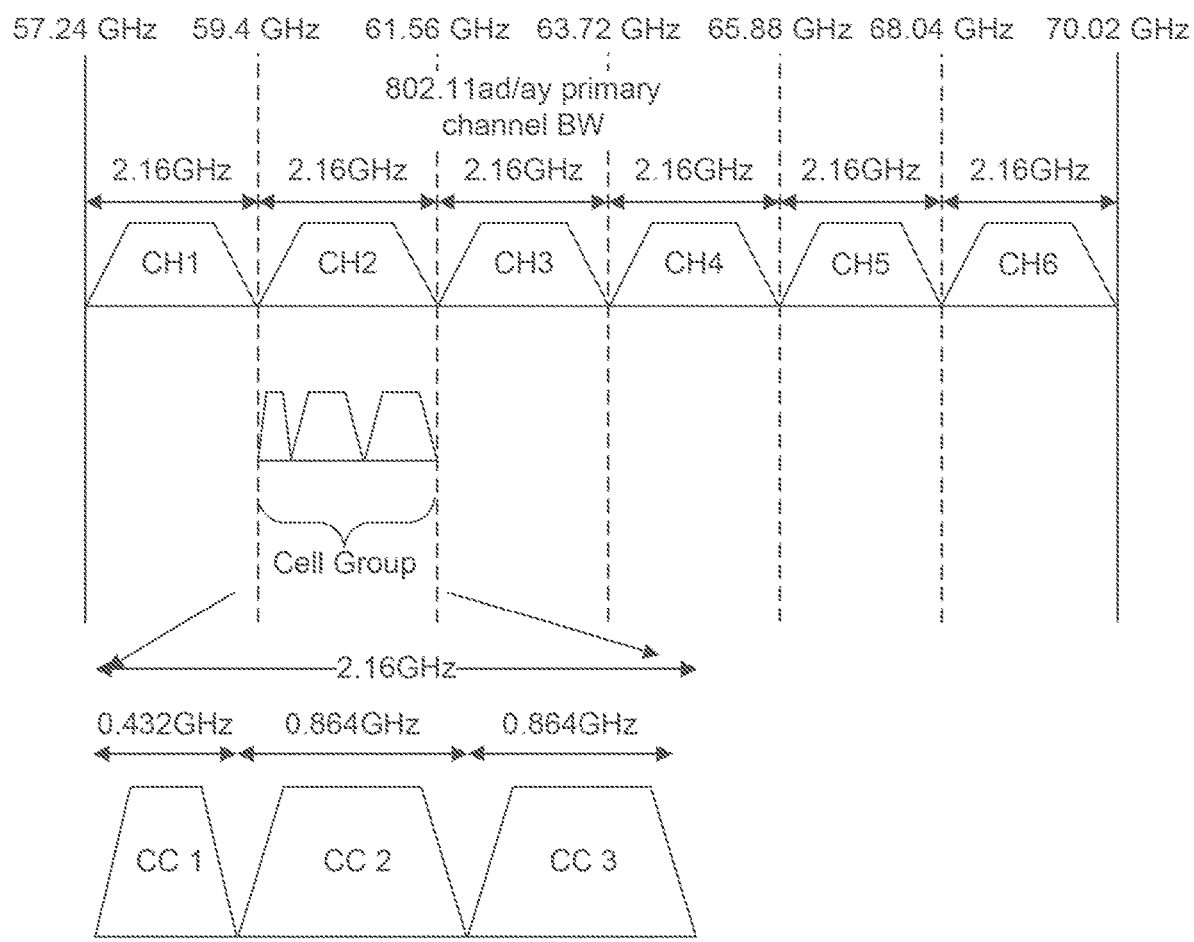
FIG. 5A illustrates an exemplary aggregated channel BW intra-band contiguous CCs in B=2.16 GHz.

For example, a UE is configured with a cell group (intra-band CA) and the aggregated channel bandwidth is equal to B as shown in FIG. 5A. In FIG. 5A, three intra-band component carriers (CCs)/cells are aggregated. The first channel BW of CC is configured as 432 MHz with µ=3 (SCS=120 KHz) and the other two channel BW of CCs are equal to 864 MHz with µ=4 (SCS=240 KHz). The aggregated CCs are within the frequency range of WiFi channel 2 from 59.4 GHz to 61.56 GHz. The aggregated channel BW is equal to 2.16 GHz as shown in FIG. 5A.

Figure 5B:
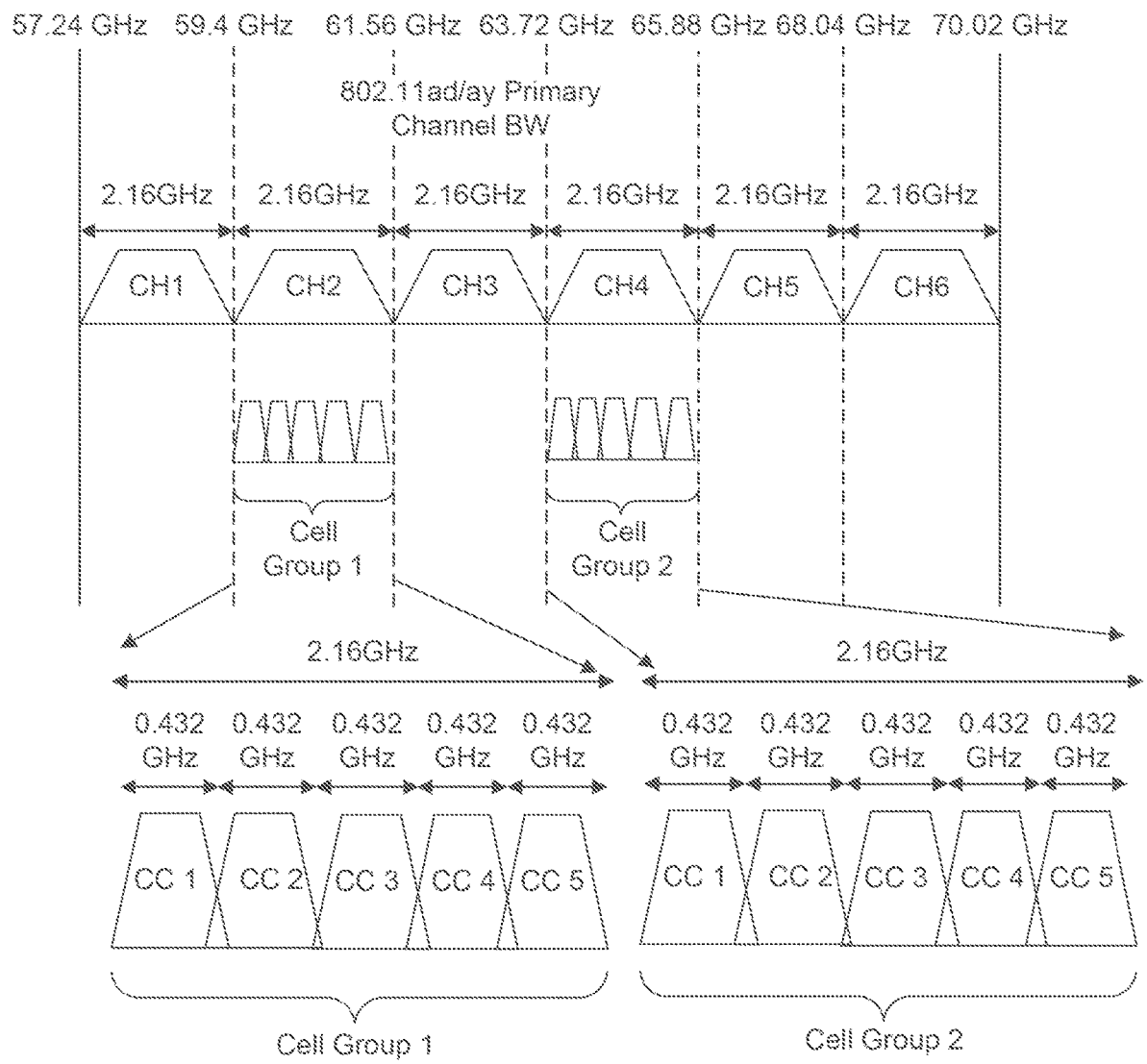
FIG. 5B illustrates an exemplary aggregated channel BW intra-band contiguous CCs in each cell group and different cell group is with non-contiguous CCs.

Second example demonstrates a UE is configured with two cell groups (intra-band CA) as shown in FIG. 5B. In cell group 1, the CCs are intra-band contiguous CA and five CCs (each CC channel BW is 400 MHz with SCS=400 MHz) are aggregated in cell group 1. In cell group 2, five CCs (each CC channel BW is 400 MHz with SCS=400 MHz) are aggregated in cell group 2 as well. The aggregated CCs in cell group 1 are within the frequency range of WiFi channel 2 from 59.4 GHz to 61.56 GHz and the aggregated CCs in cell group 2 are within the frequency range of WiFi channel 4 from 63.72 GHz to 61.56 GHz. Cell group 1 and cell group 2 are with intra-band non-contiguous CA. The aggregated channel BW is equal to 4.32 GHz as shown in FIG. 5B.

Figure 5C:
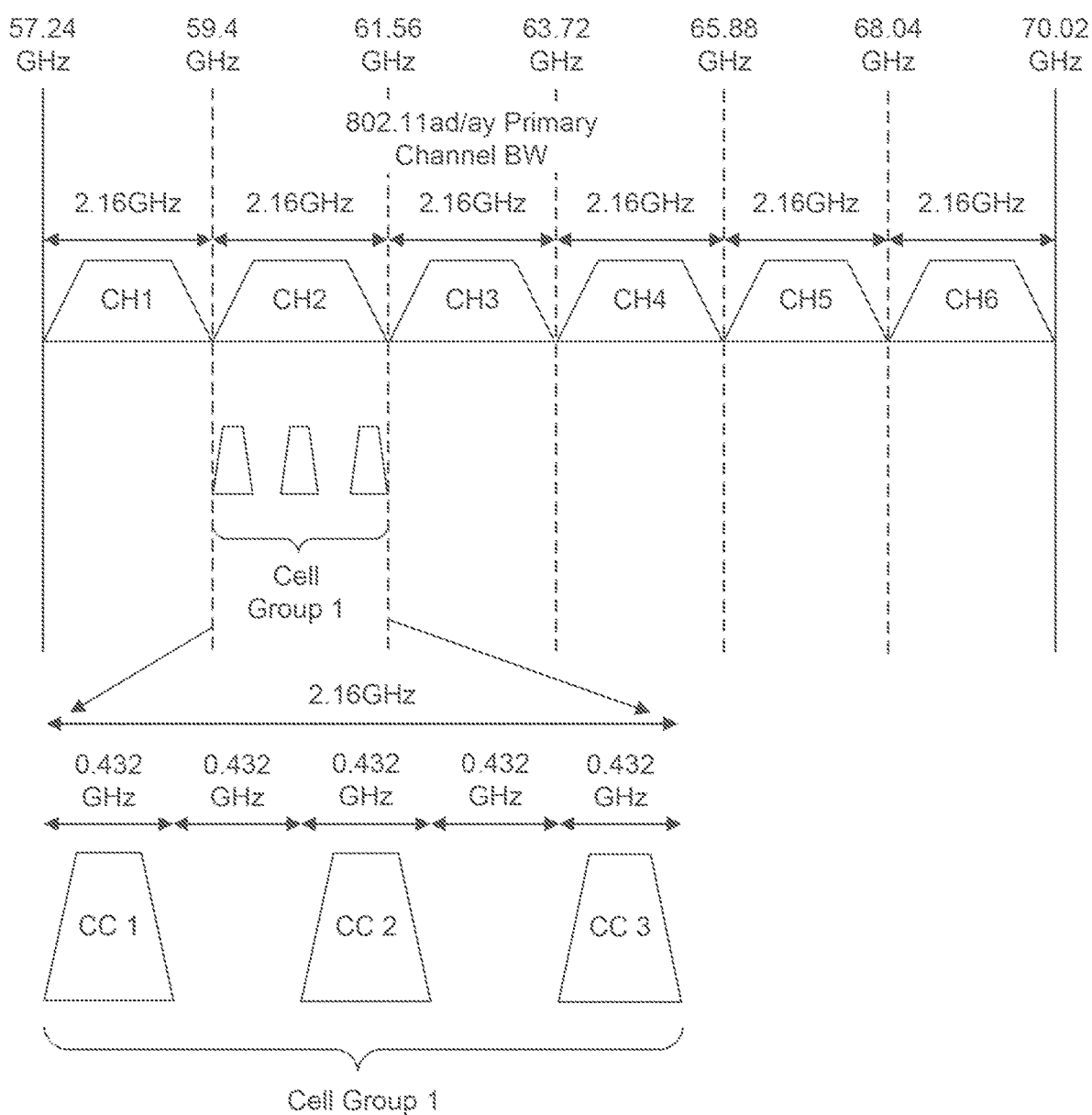
FIG. 5C illustrates an exemplary aggregated channel BW intra-band non-contiguous CCs and with a fraction of aggregated channel BW of B=2.16 GHz for NR-U from 52.6 GHz to 71 GHz and above.

Third example illustrate a UE is configured with a cell group (intra-band contiguous/no-contiguous CA) as shown FIG. 5C. In FIG. 5C, three intra-band component carriers (CCs)/cells are aggregated. The channel BW of CC is configured as 432 MHz with µ=3 (SCS=120 KHz). The aggregated (e.g., contiguous or non-contiguous) CCs are within the frequency range of WiFi channel 2 from 59.4 GHz to 61.56 GHz. The aggregated channel BW is equal to ⅗ of 2.16 GHz as shown in FIG. 5C.

The default (or preconfigured) guardband for a channel BW can be calculated based on transmission bandwidth (e.g., $N_{RB} \times SCS$) and $BW_{channel}$ as described in Eq.1. In addition, further consider indicating the guardband information for the aggregated CCs/cells when there is a need, so UE can determine the number of available PRBs in a transmission band for a CC/cell. This is because WiFi 802.11ad support channel aggregation and 802.11ay support both channel bonding and aggregation. Therefore, NR-U UE can increase the spectral efficiency and reduce interference with the availability of guardband information. More specific, the channel BW for NR-U considers being able to align with the integer multiples of B (e.g. 2.16 GHz). The channel BW has augmented than the classical/legacy channel BW supported in NR. Note: the actual transmission BW can be augmented to enhance spectral efficiency.

Let us denote a classical/legacy channel $BW=B_{1,\mu}$ (e.g. $B_{1,\mu}$=400 MHz) associated with a specific numerology µ (e.g. µ=3) and then augment this classical/legacy channel BW from $B_{1,\mu}$ to the channel $BW=B'_{1,\mu}$ (e.g. $B'_{1,\mu}$=432 MHz) and satisfy the condition that $$\frac{B}{B'_{1,\mu}} = M,$$

Figure 6:
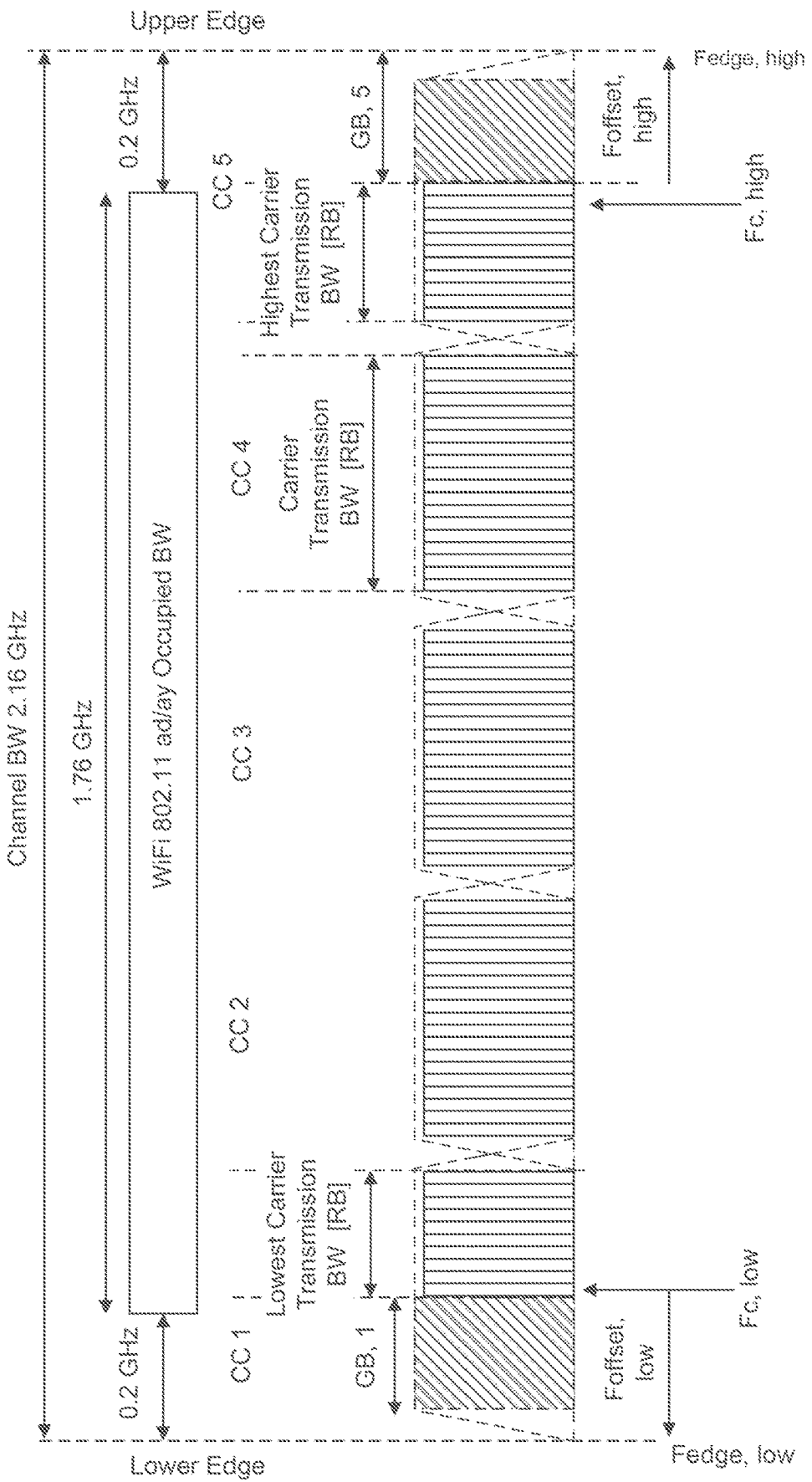
FIG. 6 illustrates an exemplary five CCs with intra-band contiguous CA and the lowest CC j=1 and/or the highest CC j=5 may reserve (extra) guardbands.

M is a positive integer (e.g. 2.16/0.432=5). In the first proposal, $N_{RB}$ is enlarged from Q RBs to Q'≥Q (e.g. from Q=264 to Q'=285) RBs to increase the spectral efficiency and meet the regulation requirement. In fact, the actual occupied BW of 802.11 ad/ay primary/secondary channel is equal to 1.76 GHz and has guardband 0.2 GHz at both sides as shown in FIG. 6. Therefore, for a carrier j in NR-U from 56.2 GHz to 71 GHz may configure (extra) guardband the highest component carrier and/or lower edge in the lowest carrier component as show in FIG. 6. In FIG. 6, there are five CCs with intra-band contiguous CA and each CC channel BW is equal to 432 MHz (meet the condition $$\frac{B}{B'_{1,\mu}} = \frac{2.16 \text{ [GHz]}}{0.432 \text{ [GHz]}} = 5).$$

In this example, the lowest CC j=1 and the highest CC j=5, it's the lowest channel edge and highest channel edge is equal to the aggregated channel lower edge and upper edge as shown in FIG. 6. Therefore, the lowest CC j=1 and/or the highest CC j=5 may be configured to reserve (extra) guardbands (note: the unit of guardband is based on RB) for reducing interference with other RAT (e.g. 802.11ad/ay).

In Rel-16 NR-U, UE can determine the number of RB sets (corresponding to integer multiples of 20 MHz) in a cell and the guardband information in each RB set i. The guardband information for each RB set in a cell is configured by RRC. However, the Rel-16 NR-U RRC configuration of guardband information for each RB set (e.g., LBT BW=20 MHz) cannot directly applied for NR from 52.6 GHz to 71 GHz and above. This is because when NR-U from 52.6 GHz to 71 GHz consider co-existence with other RAT (e.g. 802.11 ad/ay), the LBT bandwidth may have the conditions as in the following cases (e.g., Case 1 or Case 2 below).

Case 1: LBT BW for NR-U from 52.6 GHz to 71 GHz and above is set as a fraction of B (e.g. 2.16 MHz) e.g., the LBT BW denotes $$B' = \frac{B}{M},$$

where M (note: M could be equal to 1) is a positive integer and the supported channel BW for any component carrier cannot be smaller (or equal to) than B' for NR-U from 52.6 GHz to 71 GHz and above. A CC with its channel BW can be integer multiples of B'. The RB set size is equal to the LBT BW. The channel BW of a CC may be equal to an RB set size (i.e. B') or integer multiples of B'.

Case 2: The channel BW is set as integer multiple of $$B' = \frac{B}{M},$$

where M is a positive integer and B is the 802.11 ad/ay channel BW. The bandwidth of the RB set size (or LBT BW) $\hat{B}$=NB' GHz, where N is a positive integer. For example, let M=4 then the supported channel BW is integer multiples of $$B' = \frac{B}{M} = \frac{2.16}{4} = 0.432 \text{ GHz}$$

and let N=4 then the LBT BW is equal to $\hat{B}$=NB'=4× 0.432=2.16 GHz.

Disclosed herein are the following options for guardband configuration based on Case 1 and Case 2:

The description of a guardband information may be defined as $\{GB_{offset,i,j}, GB_{len,i,j}\}$ where i denotes the i-th guardband in the component carrier j. $GB_{offset,i,j}$ is the offset (in terms of CRB) from the $N_{RB,low}$, where $N_{RB,low}$ is the transmission bandwidth configurations for the lowest assigned component carrier. $GB_{len,i,j}$ is the guardband length in the units of RB. Guardband configuration per CC/cell can be provided separately for DL and UL. The number of guardband configuration for each CC/cell denotes as $N_j$ (e.g. $N_j$=1) and the total number of aggregated CCs/Cells denotes as J.

If intraCellGuardBandDL-r17 or intraCellGuardBandUL-r17 are given, then UE determines
For j=1 to J do
For i=1 to $N_j$
The available PRBs in the CC/cell based on the configuration: $\{GB_{offset,i,j}, GB_{len,i,j}\}$ for guardband i, When $\{GB_{offset,i,j}, GB_{len,i,j}\}$ is set as {0, 0} then there is no extra guardband needs to be reserved.

If intraCellGuardBandDL-r17 and/or intraCellGuardBandUL-r17 is/are not configured for a CC, then guardband is derived from the predefined specifications (e.g. based on Eq.1 with the predefined/pre-configured $N_{RB}$, SCS and $BW_{channel}$).

Figure 7A:
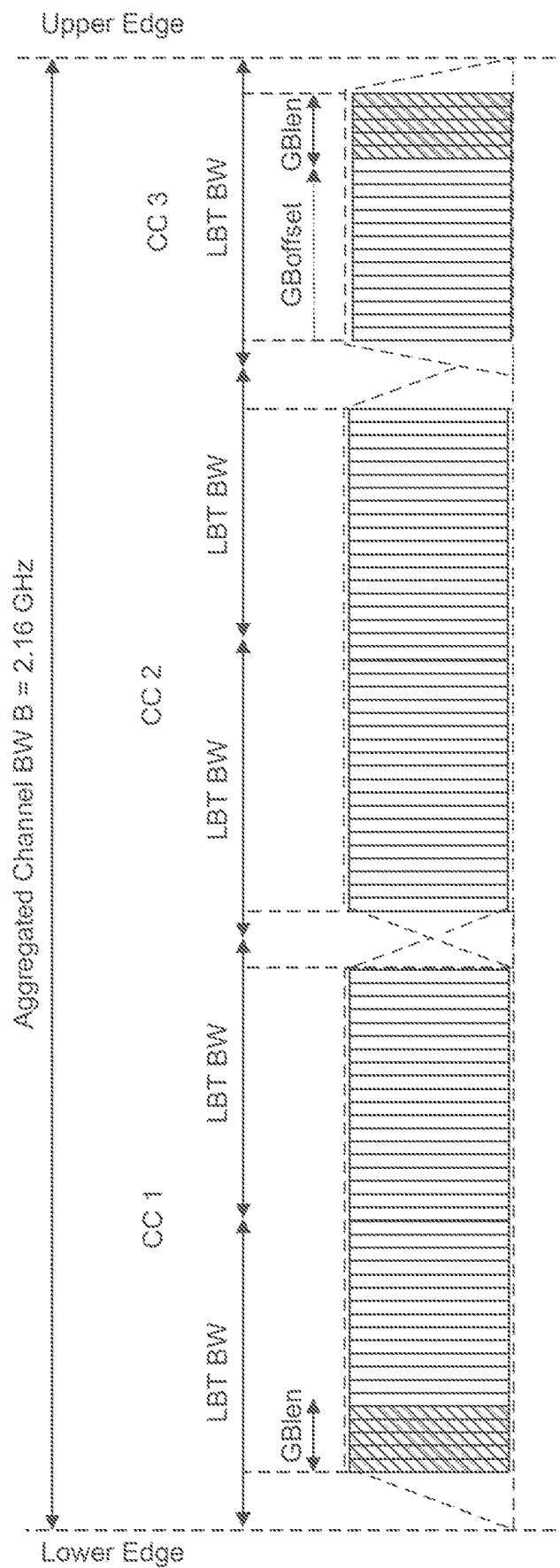
FIG. 7A illustrates an exemplary guardband configuration: intra-band contiguous CA within a bandwidth B: the lowest CC 1 and the highest CC J (e.g. J=3), the lowest CC 1 channel BW is equal to two LBT BW (or two RB sets size) and highest CC J is configured with one LBT BW (or RB set size)

An example is shown in FIG. 7A for guardband configuration case 1 when the bandwidth of a RB set is defined as fraction of B, e.g., $$= \frac{B}{M=4} = 432 \text{ MHz}/0.432 \text{ GHz},$$

and $$\frac{B}{M=4} < B \text{ MHz}$$

is the minimum supported channel BW for NR-U from 52.6 GHz to 71 GHz. As shown in FIG. 7A, there are J (e.g. J=3) CCs with intra-band contiguous carrier aggregation and the aggregated channel BW is equal to B. The lowest carrier CC 1 channel BW is equal to two LBT BW and the highest CC J=3 channel BW is equal to a LBT BW as shown in FIG. 7A. The total number of RB sets for the lowest CC 1 $M_1$=2 and the highest CC J $M_{J=3}$=1 in this example. UE can determine the number of RB sets for each CC.

Figure 7B:
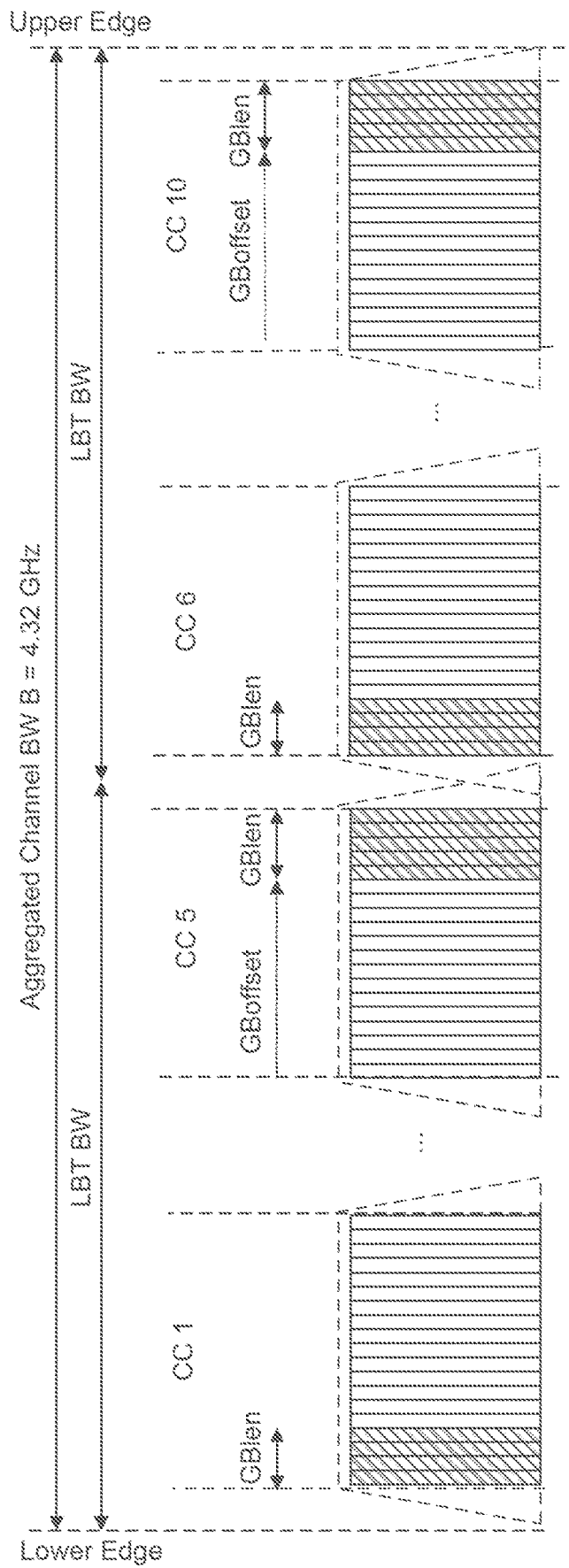
FIG. 7B illustrates an exemplary guardband configuration: Multiple CCs are aggregated in a LBT BW/RB set size (e.g. $\hat{B}$) and each CC's channel BW is $<\hat{B}$.
Figure 8:
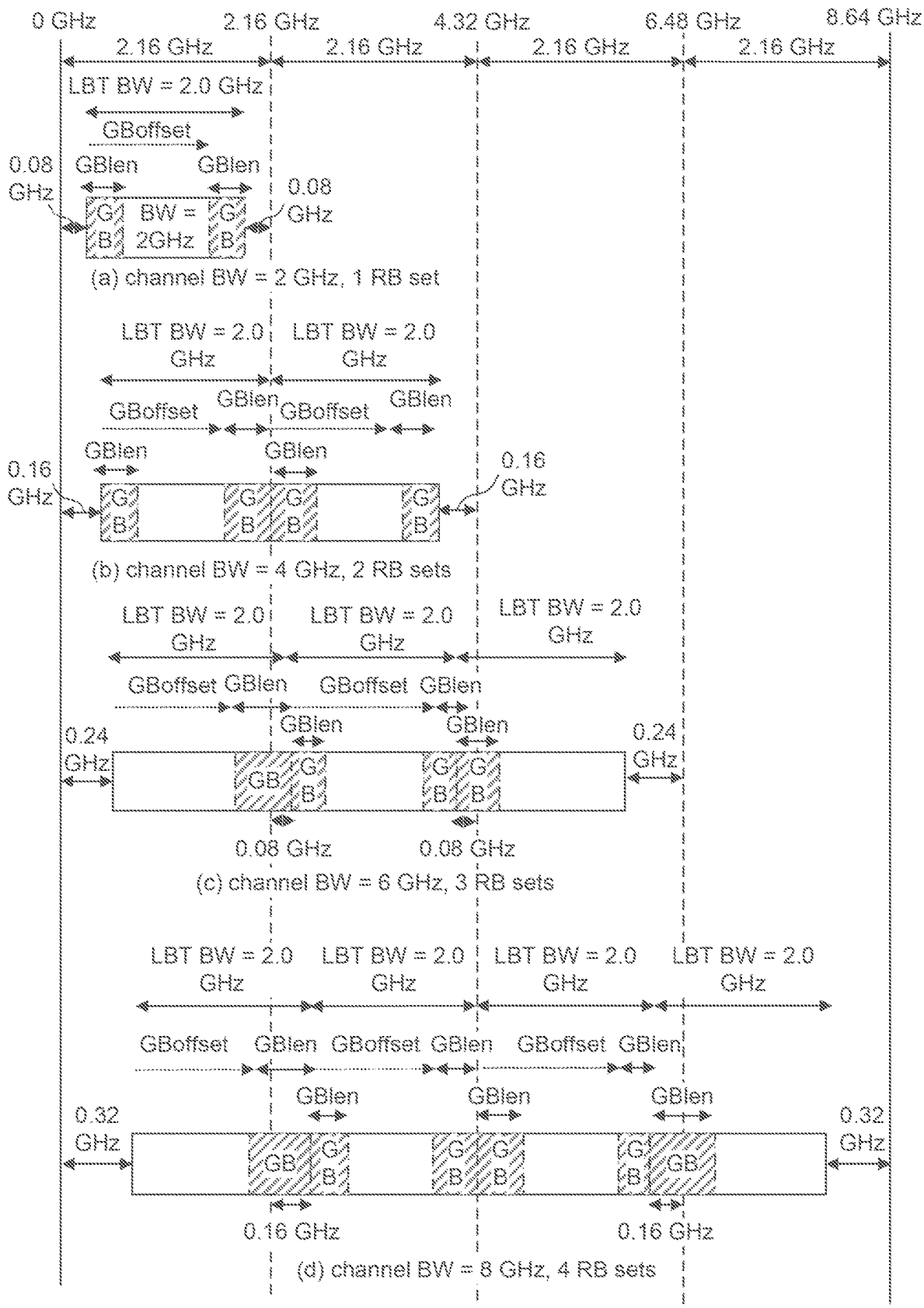
FIG. 8 illustrates an exemplary guardband configuration for RB sets when the channel BW bandwidth based on integer multiples of $\tilde{B}$ and $\tilde{B}<B$ (a) 1 RB set (b) 2 RB sets (3) 3 RB sets (4) 4 RB sets.

When the bandwidth of LBT BW/RB set size is equal to $\tilde{B}$, and multiple CCs are aggregated under a LBT BW/RB set size as shown in FIG. 7B then the guardband configuration is applied for the lowest carrier with lower edge and the highest carrier with upper edge as shown in FIG. 7B.

When multiple contiguous 802.11ad/ay channels are available, in this case, the guardband between two contiguous channels may not be necessary. Hence, disclosed herein is the enabling or disabling of the guardband for a CC/Cell can be indicted by DCI (DCI format 2_0). When the guardband Indicator (a bit mapper, the length of bit mapper is dependent on number of guardband information per CC/Cell) where the bit is set to "1" (e.g. enable) or "0" (e.g. disable) then UE can determine the indication of the corresponding configured guardband. Note:

If the higher layer parameter intraCellGuardBand(DL/UL)-r17 is configured, a list of guardband enabling or disabling indication is listed as follow:
  guardband Indicator 1, guardband Indicator 2, . . . , guardband Indicator J, where J is the total number of aggregated CCs/Cells in a cell group.

Adoption of Carrier Aggregation and the Aggregated Channel Bandwidth Does Not Align with Integer Multiples of B The regulation mandates the use of LBT in Europe and Japan but not in USA. Therefore, the method used for the channel BW (e.g. shown in Table 4) designing method in NR can be reused for co-existence with other RAT (e.g. 802.11 ad/ay) with or without mandating LBT for NR from 52.6 GHz to 71 GHz and above. The channel BW designing method of NR specification basically is determined by the supported numerology, FFT size, spectral efficiency, and the regulation requirement. In Rel-16 NR-U, the LBT bandwidth/RB set is set as 20 MHz and NR channel BW can be aligned to integer multiples of LBT bandwidth/RB set.

The supported channel BW for NR from 52.6 GHz to 71 GHz may not need to satisfy the condition of integer multiples of the channel BW used by WiFi 802.11 ad/ay. For example, listed are the possible supported channel BW shown in Table 6 based on the design principle from the Table 4. In Table 6, the possible supported bandwidth can be from 200 MHz, 400 MHz, 800 MHz to 4000 MHz, etc. However, when the supported channel BW in Table 6 cannot be exactly aligned with other RAT (e.g. 802.11 ad/ay), in this way, it may generate co-channel interference (e.g. out of band emission). Therefore, certain methods need to be disclosed for resolving the interference for co-existing with other RATs.

TABLE 6

Possible supported channel BW numerology/SCS

| SCS (kHz) | 200 MHz $N_{RB}$ | 400 MHz $N_{RB}$ | 800 MHz $N_{RB}$ | 1000 MHz $N_{RB}$ | 1600 MHz $N_{RB}$ | 2000 MHz $N_{RB}$ | 3200 MHz $N_{RB}$ | 4000 MHz $N_{RB}$ |
|---|---|---|---|---|---|---|---|---|
| 120 | 132 | 264 | N/A | N/A | N/A | N/A | N/A | N/A |
| 240 | 61 | 132 | 264 | N/A | N/A | N/A | N/A | N/A |
| 480 | 30 | 61 | 132 | 165 | 264 | N/A | N/A | N/A |
| 960 | 15 | 30 | 61 | 82 | 132 | 165 | 264 | N/A |
| 1920 | 7 | 15 | 30 | 41 | 61 | 82 | 132 | 165 |

Below are methods in which the channel bandwidth or the aggregated channel bandwidth (which can be less than B or greater than or equal to B) don't need to align with integer multiples of B (e.g., 2.16 GHz) to consider co-existing with other RAT (e.g., 802.11 ad/ay). The following cases are considered.

Case 1: the channel BW and/or the aggregated channel BW is integer multiple of LBT BW/RB set size $\tilde{B}$ and the supported channel BW for any CC is greater than or equal to $\tilde{B}$ (e.g., LBT BW/RB set size) for NR-U from 52.6 GHz to 71 GHz and above. The channel BW or the aggregated BW is integer multiple of LBT BW/RB set size. The LBT BW/RB set size can be based on $\tilde{B}$ or the fraction of $\tilde{B}$ (e.g., $$\frac{\tilde{B}}{M}$$

where M is a positive integer). $\tilde{B}$ assumes as the maximum supported channel bandwidth or the aggregated channel bandwidth within B, so it can satisfy the condition $$\min_{\tilde{B}<B}(B-\tilde{B}).$$

Figure 3:
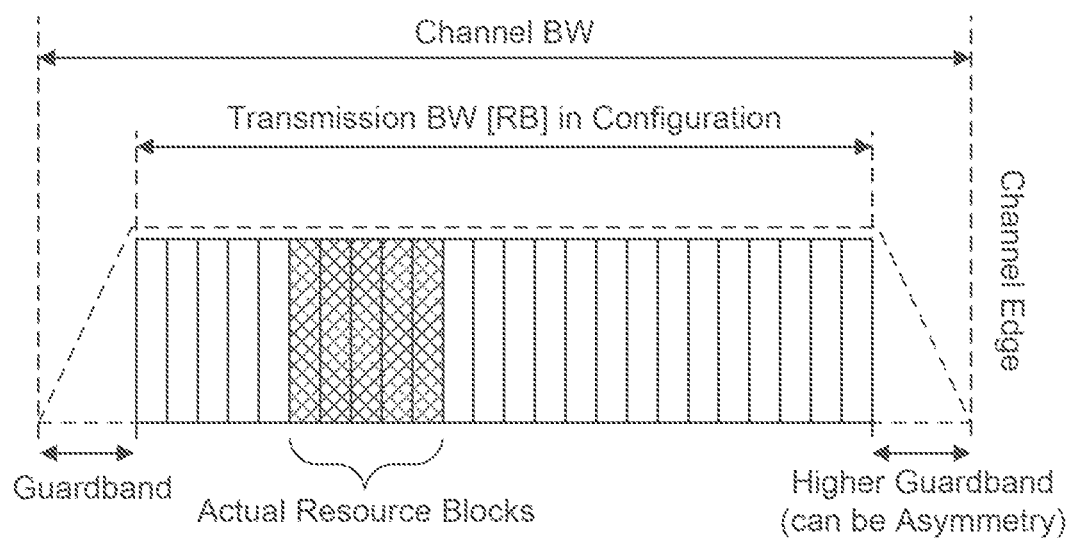
FIG. 3 illustrates an exemplary definition of the channel bandwidth and the maximum transmission bandwidth configuration for one NR channel.
Figure 4:
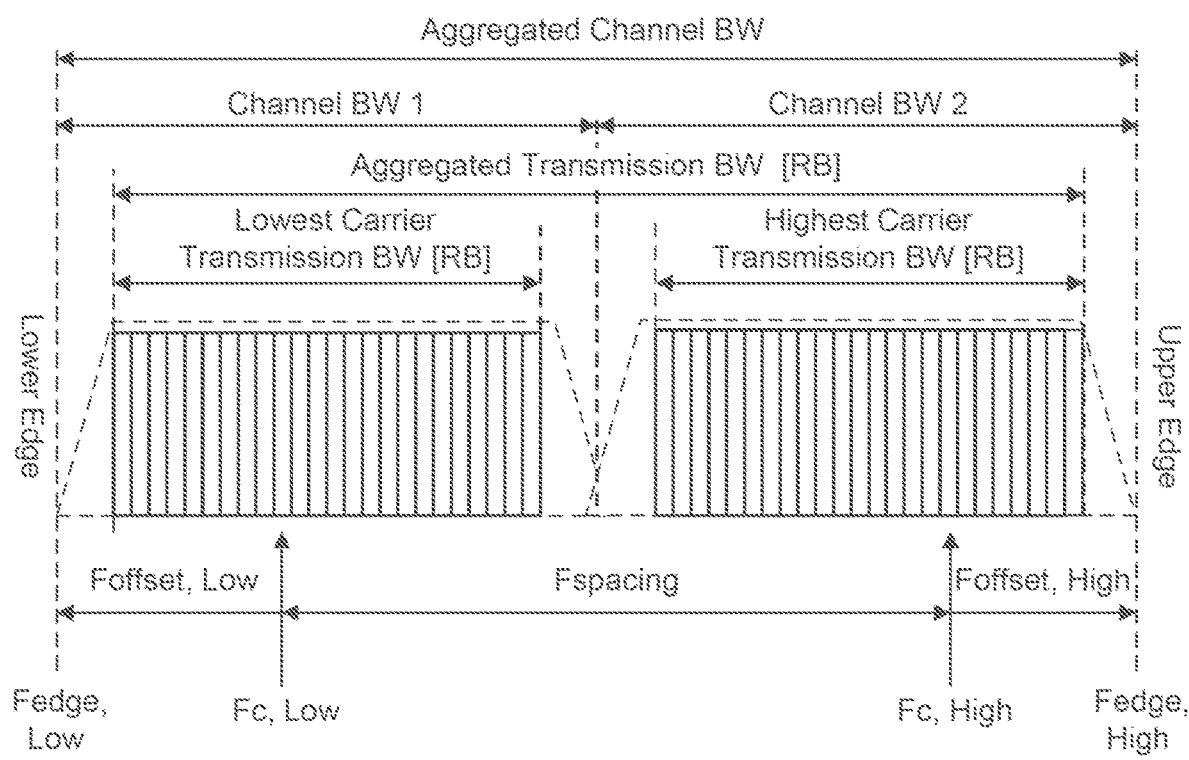
FIG. 4 illustrates an exemplary definition of (two) aggregated channel bandwidth for intra-band carrier aggregation.

For example, $\tilde{B}$ can be equal to 2 GHz referred from the Table 6 and B is equal to 2.16 GHz. In this case, we disclosed LBT BW may be set to be equal to channel BW or (integer) fractional of channel BW. For example, LBT BW (or RB set size) can be set to be equal to its carrier channel BW, thus gNB or UE perform LBT for each activated component carrier (CC) as shown in FIG. 8A-FIG. 8D. Note: this proposal also is applicable if there is a defined transmission BW (e.g., $N_{RB,low}$ and $N_{RB,high}$ shown in FIG. 3) in a CC then gNB or UE perform LBT for each transmission BW in a CC.

Case 2: the channel BW is set as integer multiple of $$\tilde{B}' = \frac{\tilde{B}}{M},$$

where M is a positive integer and $\tilde{B}$ is the almost equal to B discussed in the case 1. The bandwidth of the RB set size (or LBT BW) $\hat{B}'=N\tilde{B}'$ GHz, where N is a positive integer. For example, let M=10 then the supported channel BW is integer multiples of $$\tilde{B}' = \frac{\tilde{B}}{M} = \frac{2}{10} = 0.2 \text{ GHz}$$

and let N=10 then the LBT BW is equal to $\hat{B}'=N\tilde{B}'=10\times 0.2=2$ GHz. In other words, a LBT BW could be over several (or all) CCs, thus gNB or UE can perform a LBT for several (or all) CCs. Note: this way also is applicable if there is a defined transmission BW for each CC. gNB or UE performs a single LBT over the transmission bandwidth over all CCs (from the $N_{RB,low}$ in the lowest CC to the $N_{RB,high}$ in the highest CC used for the transmission shown in FIG. 3).

Dependent on the aggregated channel BW and with a proper frequency offset setting for the lower edge of a channel, the configured guardband information element for a defined in Rel-16 NR can be reused for NR-U from 52.6 GHz to 71 GHz. Therefore, it can reduce the effort for the standard specification.

Figure 9:
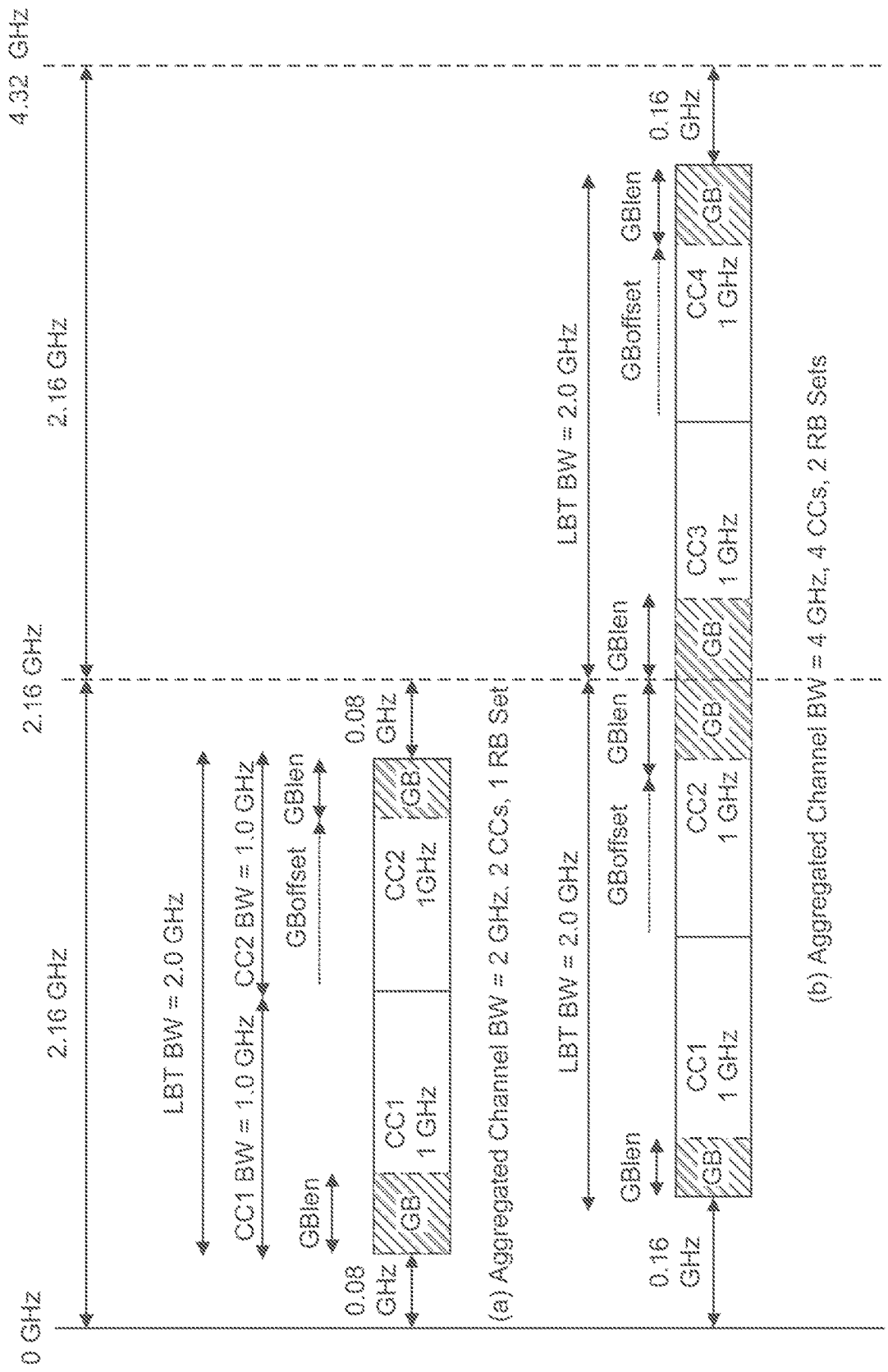
FIG. 9 illustrates an exemplary guardband configuration for RB sets when the aggregated channel BW bandwidth based on integer multiples of $\tilde{B}$ and $\tilde{B}<B$ (a) 1 RB Set (b) 2 RB sets.
Figure 10:
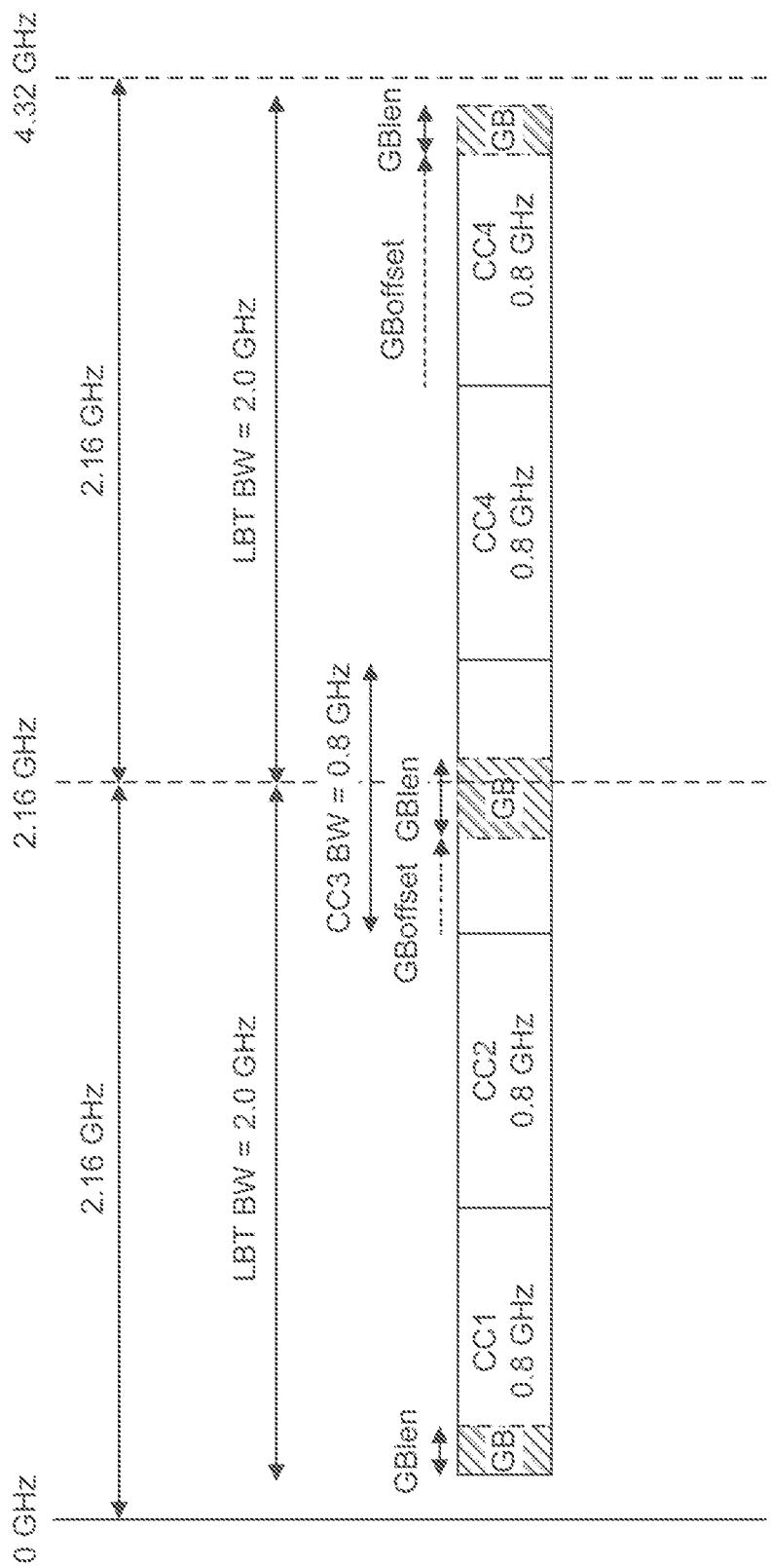
FIG. 10 illustrates an exemplary guardband configuration for RB sets when the aggregated channel BW bandwidth based on integer multiples of $\frac{\tilde{B}}{M}$ and $\tilde{B}<B$.

For example, listed are four possible channel BW (or aggregated channel BW) configuration like {2, 4, 6, 8} GHz with the frequency offset {0.08, 0.16, 0.24, 0.32} GHz, respectively for a UE as shown in FIG. 8A-FIG. 8D and FIG. 9A-FIG. 9B. The frequency offset is calculated based on the (maximum) channel BW supported by NR $\tilde{B}$ (e.g., 2 GHz), $\tilde{B}<B$ and integer multiples of $\tilde{B}$ factor m (e.g. m=2, 3, ... ). With setting a proper frequency offset for the starting point of lower edge of a channel (or aggregated CCs) as shown in FIG. 8A-FIG. 8D and FIG. 9A-FIG. 9B, the configured guardband information at both the lower and higher edge of each RB set i can be maintained. As shown in FIG. 9A-FIG. 9B, each CC is with 1 GHz of channel BW and two CCs are with intra-band contiguous CA.

Figure 11A:
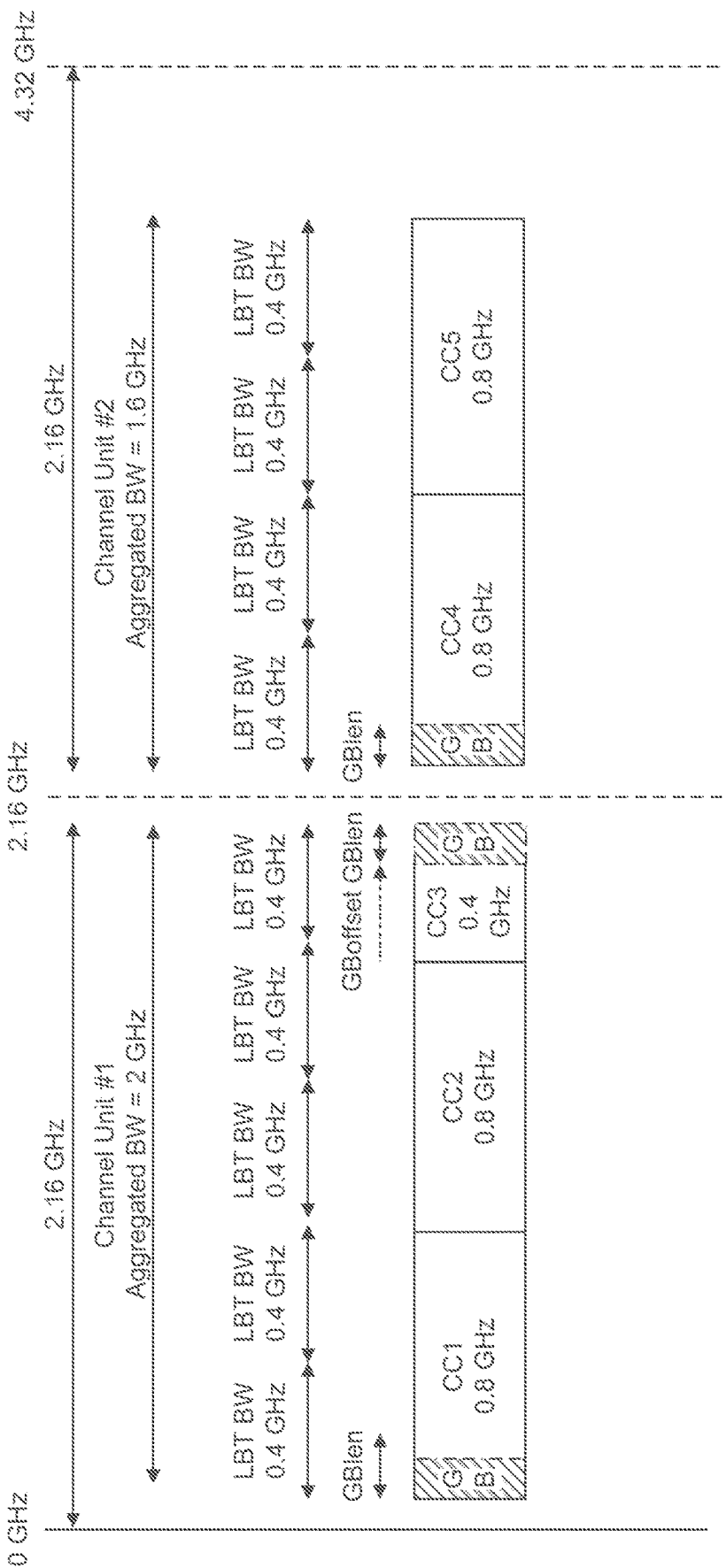
FIG. 11A illustrates an exemplary multiple channel unit assign for a UE and the channel BW or the aggregated channel BW is confined in the channel unit: two channel units and LBT BW=0.4 GHz.
Figure 11B:
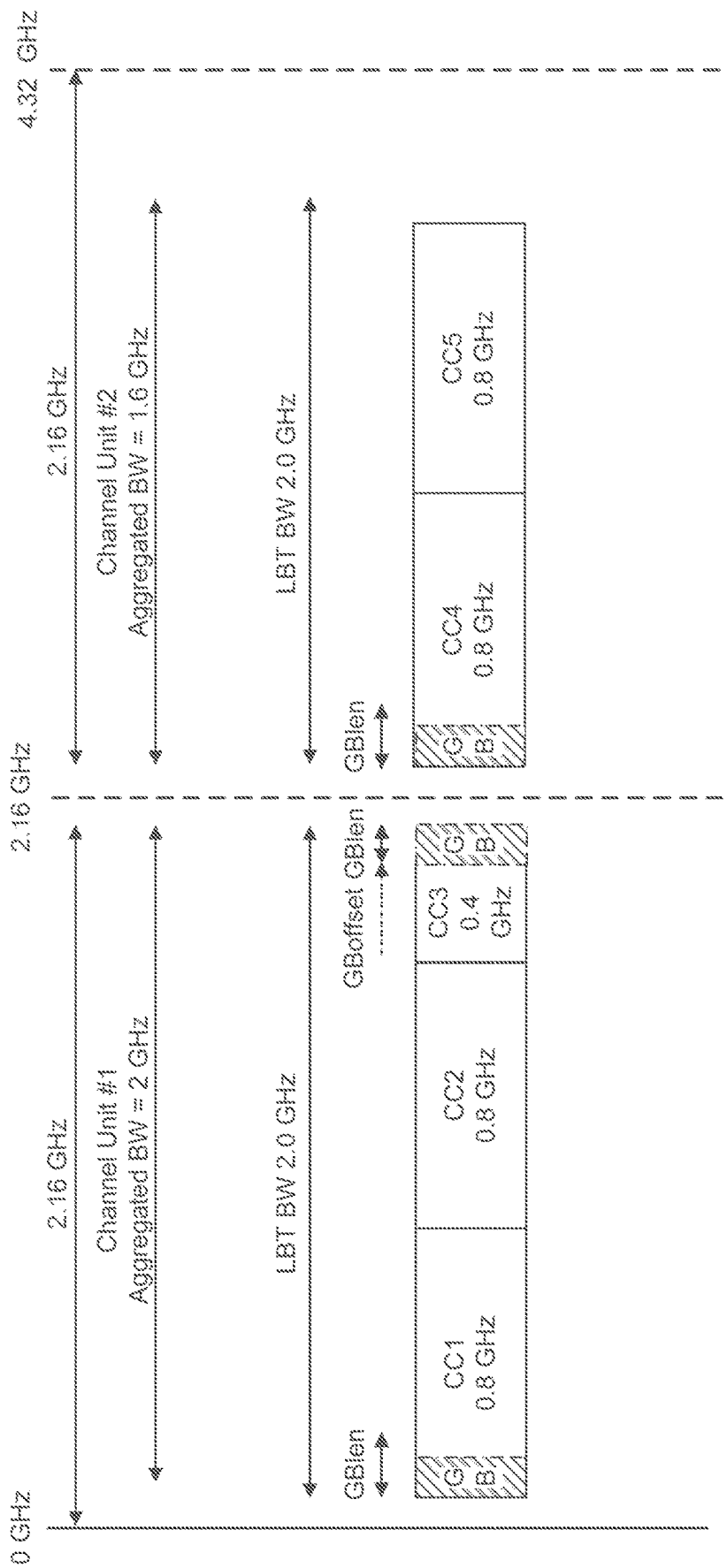
FIG. 11B illustrates an exemplary multiple channel unit assign for a UE and the channel BW or the aggregated channel BW is confined in the channel unit: two channel units and the LBT BW is 2 GHz.

In the FIG. 8A-FIG. 8B, first assume the bandwidth of the RB set is defined as $\tilde{B}$ (e.g., 2 GHz) and it is shown that the disclosed method also can extend to the case when the RB set size (the bandwidth of the RB set) is equal to $$\tilde{B} = \frac{\tilde{B}}{M}$$

where M is an positive integer. As shown in FIG. 11A-FIG. 11B, the aggregated channel BW is equal to $\tilde{B}$ and $2\tilde{B}$, respectively and the RB set size is equal to $$\tilde{B} = \frac{\tilde{B}}{M=5} = 400 \text{ MHz.}$$

The guardband configuration methods described herein (e.g., Adoption of carrier aggregation and the aggregated channel bandwidth aligns with integer multiples of B) for Case 1 and 2 can be reused for this case. The only modification is changing the B to $\tilde{B}$. Disclosed herein are the following options for guardband configuration when the channel BW or aggregated channel BW is integer multiple of RB set:

Case1: If the LBT BW/RB set size is a fraction of or equal to $\tilde{B}$, i.e, $$\tilde{B}' = \frac{\tilde{B}}{M},$$

where M is a positive integer then the RRC parameters intraCellGuardBandDL-r17 and intraCellGuardBandUL-r17 (if UL is configured) are used to configure the lists of intra-band/carrier guardbands CCs/cells for DL and/or UL, e.g.:

The rest of sub-bullet items reuse from herein associated with Adoption of carrier aggregation and the aggregated channel bandwidth aligns with integer multiples of B.

Case 2: If the LBT BW/RB set size $\tilde{B}$ GHz then the RRC parameters intraCellGuardBandDL-r17 and intraCellGuardBandUL-r17 (if UL is configured) are used to configure the lists of intra-band/carrier guardbands CCs/cells for DL and/or UL, e.g.:

The rest of sub-bullet items reuse from herein associated with Adoption of carrier aggregation and the aggregated channel bandwidth aligns with integer multiples of B.

In addition, the enabling or disabling of the guardband in each RB set can be indicted by DCI (e.g., DCI format 2_0). The RB set Indicator is set to "1" (e.g. enable) or "0" (e.g. disable).

Disclosed herein is another channelization method called as "channel unit" in the following.

Channel Unit

When the channel BW of a CC/Cell or the aggregated channel BW of CCs is confined in BW B (e.g., B=2.16 GHz) thus defined herein is the "channel unit" as follows. For example, in a channel unit, multiple aggregated CCs can be supported, and the aggregated channel BW is confined by the channel bandwidth B (e.g., B=2.16 GHz). In another example, in a channel unit, it can support intra-band contiguous or non-contiguous carrier aggregation.

Multiple channel units can be configured for a UE as shown in FIG. 11A and FIG. 11B. In this way, the channel BW of a CC/Cell or the aggregated channel BW is confined in a channel unit. From the definition of channel unit, no RB set can be cross more than one channel unit. The bandwidth of the RB set can be based on $\tilde{B}$ (e.g. $\tilde{B}$=2 GHz) or $$\tilde{B}' = \frac{\tilde{B}}{M}$$

where M is a positive integer. The guardband configuration methods described herein (e.g., regarding Adoption of carrier aggregation and the aggregated channel bandwidth aligns with integer multiples of B) for Case 1 and 2 can be reused for this case. The only modification is changing the B to $\tilde{B}$.

As shown in FIG. 11A, a UE is configured with two "channel units" and there are three CCs (with two 0.8 GHz channel BW and one 0.4 GHz channel BW) are aggregated in first channel unit and two CCs (with 0.8 GHz channel BW) are aggregated in the second channel unit. In FIG. 11A, it is assumed that the RB set size is equal to $\tilde{B}'$ (e.g. 0.4 GHz). Therefore, there are 5 RB sets in the first channel unit and four channel units in the second channel unit. In other words, a unit of LBT BW are formed in each CC and gNB or UE performs LBT in all the LBT units (to be transmitted in) in the channel bandwidth in each CC within the channel unit as shown in FIG. 11A. Same CA configuration in FIG. 11A is applied for FIG. 11B, but the RB set size is equal to $\tilde{B}$ (e.g. $\tilde{B}$=2 GHz). Therefore, there are three CCs and one RB set in channel unit 1, and there are two CCs and one RB set in channel unit 2. In this case, a unit of LBT BW may be formed over multiple CC(s) and gNB or UE performs LBT in all the LBT units (to be transmitted in) in the channel bandwidth within a channel unit.

LTB Schemes and COT Sharing for NR from 52.6 GHz to 71 GHz and Above

A UE can be configured with single or multiple cell group(s) and each CC in a cell group can be configured for TDD or FDD. Contiguous and non-contiguous (intra-band) aggregated CCs can be applied for the scenario where the channel access opportunities may be contiguous for contiguous aggregated CCs in a wide range of frequency band and/or be dispersed from a wide range of frequency band for non-contiguous aggregated CCs. Therefore, the channel access opportunities can be implemented via the contiguous and non-contiguous carrier aggregation. If LBT for NR-U from 52.6 to 71 GHz and above is mandated for co-existence with other RAT(s) (e.g. 802.11ad/ay), then LBT and COT sharing methods need to be considered with the carrier aggregation, especially when the carrier/channel BW of the aggregated CC are smaller than the channel bandwidth of other RAT (e.g. 802.11ad/ay).

Addressed herein are at least the following cases. For example, Case 1: other RAT's channel BW is integer multiple of the LBT BW/RB set for NR-U from 52.6 GHz to 71 GHz. The (almost equal to B) BW $\tilde{B}$ means the maximum supported channel bandwidth within B. Note: this is not limited to the number of carriers is aggregated in a channel number. The number of aggregated cell could be equal to 1 or more than 1.

Case 1

First of all, let $\tilde{B}'$ denote the LBT BW (RB set size, or a CC channel/transmission BW) for NR-U and B denote the channel BW of other RAT (e.g. 802.11 ad/ay) and assume that $\tilde{B}'<B$. Let $$\eta = \left\lfloor \frac{B}{\tilde{B}'} \right\rfloor$$

so $\eta$ is a positive integer. From the definition of $\eta$, it can guarantee that there are at most $\eta$ RB sets in a channel BW B. For example, $\eta=5$ when the NR-U RB set size $\tilde{B}'=0.4$ GHz and B=2.16 GHz. If gNB or UE initiates the LBT, then gNB or UE is responsible for performing LBT based on whole or a portion of channel BW B. If there is an available channel after gNB performing the LBT (e.g. one of channel number from WiFi 802.11 ad/ay channel number 1 to 4), then the result of LBT for that channel can be groupcasted or unicast to UEs via DCI format 2_0. When gNB or UE initiates the LBT for a channel number and once gNB or UE get the LBT result, it may replicate the LBT results by $\eta$ times for this channel number if the SCell is with self-scheduling or LBT results can be independently based on each RB set or CC when RB set size is equal to CC channel or transmission BW.

Figure 12:
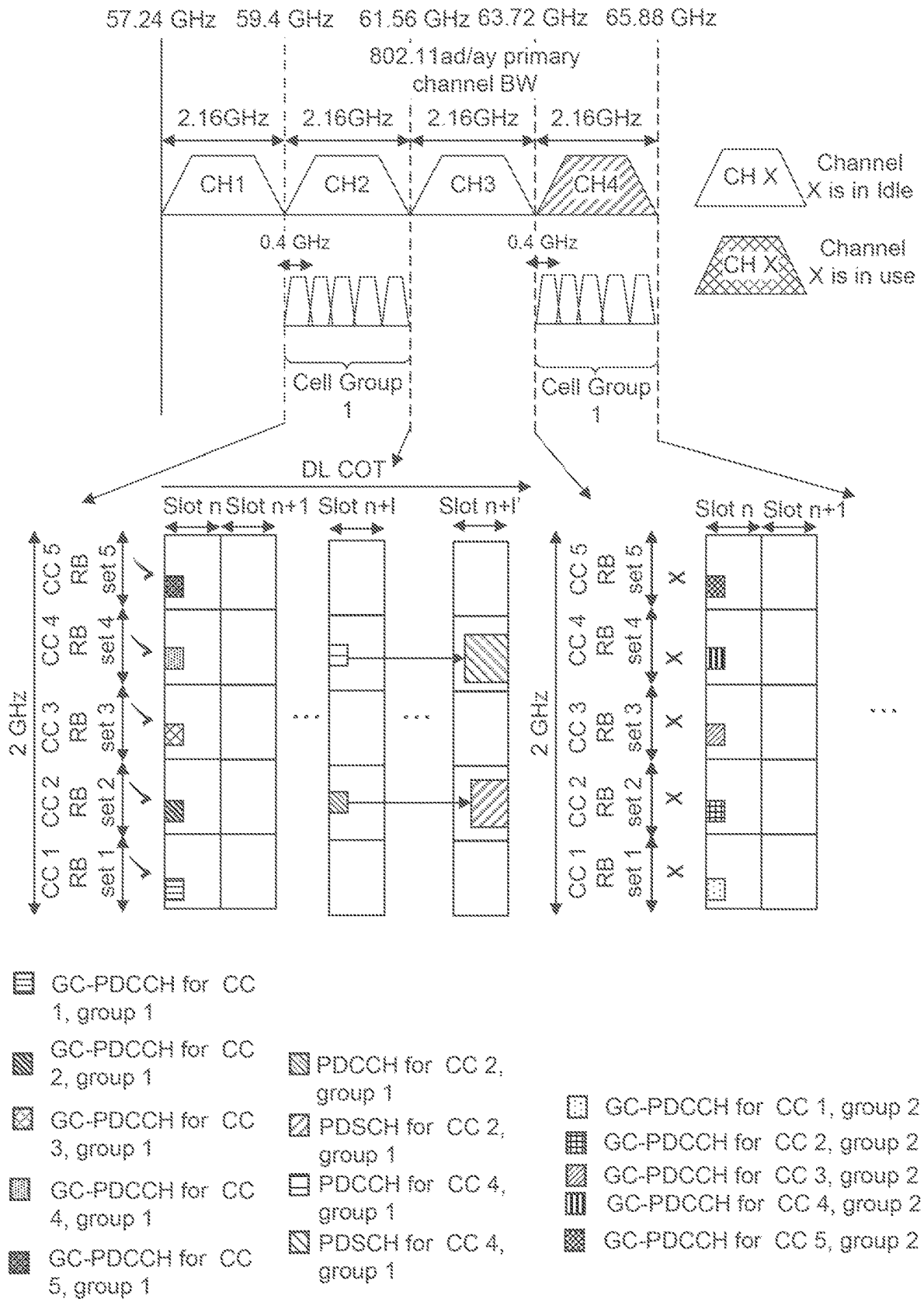
FIG. 12 illustrates an exemplary LBT results are groupcast to UE when gNB initiate the LBT when gNB initiate the LBT.

For example, a UE is configured with two cell groups. The first cell group is configured for a channel with a channel number 2 and the second cell group is configured for a channel with a channel number 4 as shown in FIG. 12. Each cell group may include of five aggregated component carriers and each CC's channel BW is equal to 0.4 GHz (or 400 MHz) as shown in FIG. 12. The LBT results (e.g. initiated by gNB) determines that channel number 2 is available and channel number 4 is busy as shown in FIG. 12. It is further assumed that the RB set size is equal to 0.4 GHz, therefore, when each CC channel/carrier BW is equal to an RB set size, the LBT result in a channel BW B can be replicated by (maximum) $\eta$ e.g. (=5) times. When network assumes that each CC is configured with self-scheduling (e.g., no cross-scheduling) then a UE may monitor each CC for its own DCI format 2_0 and other DCI formats individually and gNB may transmit DCI for the CCs.

When the LBT BW/RB set size or CC channel BW is smaller than the other RAT channel BW, DCI format 2_0 need to carry (all) configured cell's/CC's COT and the RB sets information with self-scheduling. DCI format (e.g., 2_0) can be used for the indication of RB set availability of each CC/SCell in the cell group with self-scheduling. In this scenario, it may waste the signaling overhead of the COT and RB set availability for each CC/SCell with self-scheduling. Therefore, disclosed herein is that gNB may transmit the COT and RB set availability for a CC/cell within a channel and not transmit the RB set availability to other CCs/cells within the same channel, where CC/cell within a channel means that the channel edge of the CC is within the channel BW (e.g. the CC #1 within the channel number 2 as shown in FIG. 12). Thus, once the UE receive the DCI format 2_0 from a cell in the channel then UE can apply the COT and RB availability information to other CCs within the same channel number. Otherwise, the COT and RB availability can be independently for CCs/cells within the same channel when the COT information is different among CCs/cells in the same channel.

Another approach is that the UE only monitors the DCI format 2_0 in the primary cell/primary secondary cell group cell (e.g., PCell/PSCell) or a scheduling SCell, thus the number of PDCCH monitoring can be reduced. Therefore, in this case, cross-scheduling is preferred for NR-U UE to operate in the wideband scenario from 52.6 GHz to 71 GHz and above. Similar to Rel-16 NR-U, the UE needs to frequently monitor the COT and LBT results (to reduce the missed channel access opportunity) from GC-PDCCH with a configured CORESET in the PCell/PSCell/scheduling SCell. Therefore, the UE can be configured to use the shorter period of search space for monitoring a DCI format (e.g., 2_0) and then switch to a longer period of search space for monitoring the UE-specific search space in the PCell/PSCell/scheduling SCell. The UE may monitor a DCI format (e.g., 2_0) in the PSCell/PCell/scheduling SCell and once the corresponding DCI format (e.g., 2_0) is detected, UE can switch to monitor one or multiple longer period search space(s) for UE-specific PDCCH(s) reception. In other words, after the UE obtains the COT and available RB sets indication from a DCI format (e.g., 2_0), the UE may switch to monitor one or multiple UE-specific PDCCH(s) for dynamic scheduling for other non-scheduling SCells. The COT and RB set availability indication can be indicated for PSCell/PCell/scheduling SCell only, and once PSCell/PCell/scheduling SCell receive the COT and RB set indication then the UE can apply the received RB set indication to other CCs/cells within the same channel. Therefore, the signalling overhead for LBT results/RB set can be reduced. Otherwise, the COT and RB availability can be independently indicated for each CCs/cells within the same channel when the COT information is different among CCs/cells in the same channel. For this scenario, the UE still monitors a single GC-PDCCH in the PCell/PSCell/scheduling SCell.

The maximum number of PDCCH for configured cell groups can be based on the carrier aggregation capability for Rel-17 (e.g. UE-NR-Capability-r17) or it can be based on a number provided by pdcch-BlindDetectionCA-r17 (e.g. $N_{cells}^{gap-r17}$).

However, PSCell or PCell may be blocked due to the LBT results for a certain channel (e.g. channel 4 shown in FIG. 12) that are already occupied by other RAT (e.g. 802.11 ad/ay). Therefore, if the (aggregated) channel BW of a UE is larger than the channel BW B and the UE is configured with single PSCell or PCell, scheduling SCell, then the UE cannot perform the co-scheduling PDCCH (including group common PDCCH and UE specific PDCCH) and PDSCH for the aggregated CCs when the one of the channels is occupied by other RAT and the occupied channel blocks the PsCell/PCell/scheduling SCell for co-scheduling. To overcome this issue, the following methods are disclosed.

In an example method, in each channel where the channel refers to the channel number used by other RAT (e.g. 802.11 ad/ay), one SCell can be configured for co-scheduling within the same channel. In other words, if UE is assigned with m (e.g. m=2) channels (e.g. channel number 2 and 4 shown in FIG. 13) then there are m (e.g. m=2) SCells for co-scheduling in this case and a SCell can be configured for co-scheduling PDCCH and PDSCH for each assigned channel. Note, the channel edge of the scheduling SCell is within a channel.

In another example method, the UE can be configured with multiple cell groups and each cell group is associated with a channel number. One SCell is configured for co-scheduling in each cell group. If a UE is configured with m channels, then in this case, m (e.g. m=2) cell groups are configured and one SCell in each cell group is configured for co-scheduling so m (e.g. m=2) SCells for co-scheduling. Note, the channel edge of the scheduling SCell is within a channel.

Figure 13:
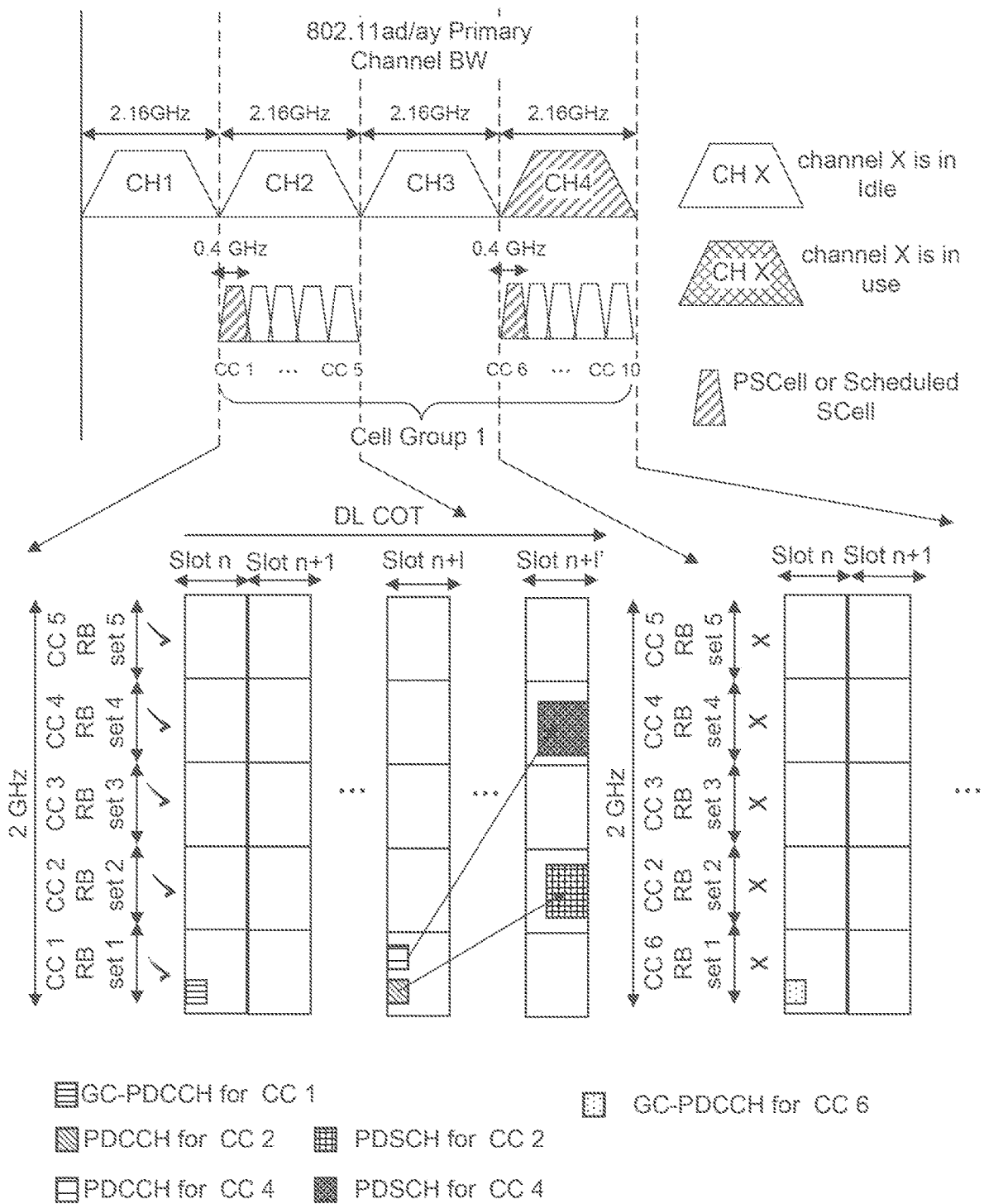
FIG. 13 illustrates an exemplary LBT results are groupcast to UE when gNB initiate the LBT and co-scheduling when gNB initiate the LBT.

For example, as shown in FIG. 13, a UE is configured with two channels (e.g. one channel with channel number 2 and the other channel with channel number 4) and in each channel it is with intra-band contiguous carrier aggregation but with intra-band non-contiguous carrier aggregation between channels. Since the usage of each channel must compete with other RAT (e.g. 802.11ad/ay), there is a need to assign one serving cell for co-scheduling purpose for each assigned channel. For example, as shown in FIG. 13, CC 1 is configured for co-scheduling CC 2, CC 3, CC 4, and CC5, and CC 6 is configured for co-scheduling CC 7, CC 8, CC 9, and CC10. If the channel 4 is already occupied, then gNB is still able to perform co-scheduling on the channel 2.

Figure 14:
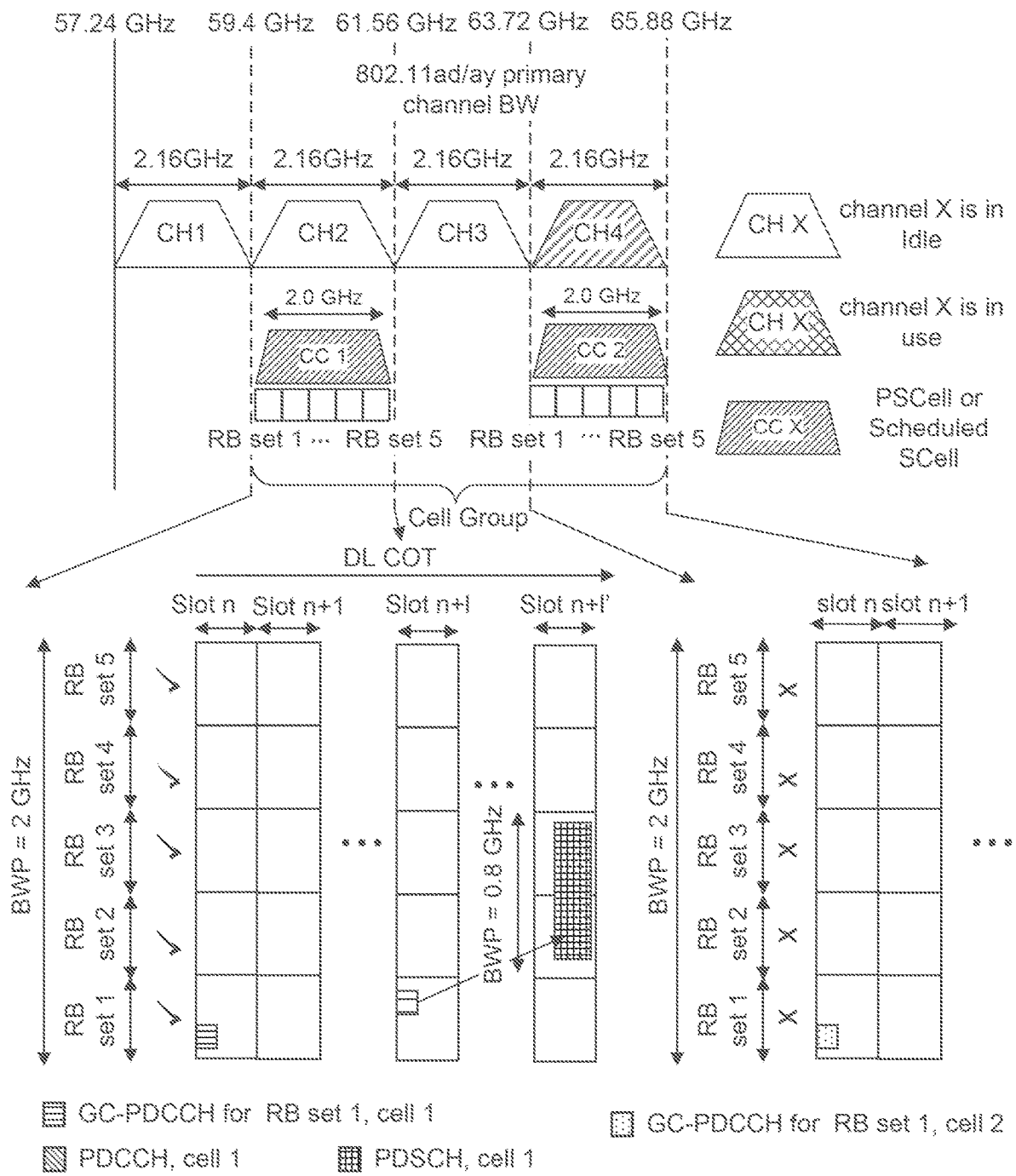
FIG. 14 illustrates an exemplary LBT are groupcast to UE with wideband operation and carrier aggregation when gNB initiate the LBT.

This scheme can be extended for the case when the aggregated channel BW for a UE is larger than B or integer multiples of B. The channel bandwidth for each CC can be set as integer multiple of RB set size, e.g., the channel bandwidth of a CC can be expressed as M×B̃' GHz, where is M is a positive integer. For example, a UE is configured with two CCs/cells in a cell group, each CC/cell channel BW is equal to 5×B̃' when M is equal to 5 and two CCs/cells are intra-band non-contiguous carrier aggregation as shown in FIG. 14. In other words, the RB set configuration can be equivalent to that the network define a unit of LBT BW and gNB/UE performs LBT in all the LBT units in the channel bandwidth in each CC. Further assumed may be the UE is configured with an activated bandwidth part (BWP) and the BWP bandwidth is equal to 5×B̃' e.g., BWP can be partitioned into 5 RB sets. According to Rel-16 NR-U specification, when a wideband BWP with integer multiples of RB sets, each RB set can have independent signaling for COT sharing indication, available RB set(s), etc. via DCI format 2_0. Hence, the RB sets are within the same channel number can share a GC-PDCCH for DCI format 2_0 reception. In this case, UE do not need to monitor the RB sets within a same channel number for monitoring DCI format 2_0. Therefore, the UE can be configured with a CORESET and its PRBs allocated by by frequencyDomainResources is within a RB set or a BWP whose bandwidth equals to RB set size (e.g. the narrow BWP BW=an RB set size B̃') for DCI format (e.g., 2_0) reception. If there is a scheduled PDSCH with BWP switching, then DCI format (e.g., 2_0) can be monitored at the activated BWP.

Figure 15:
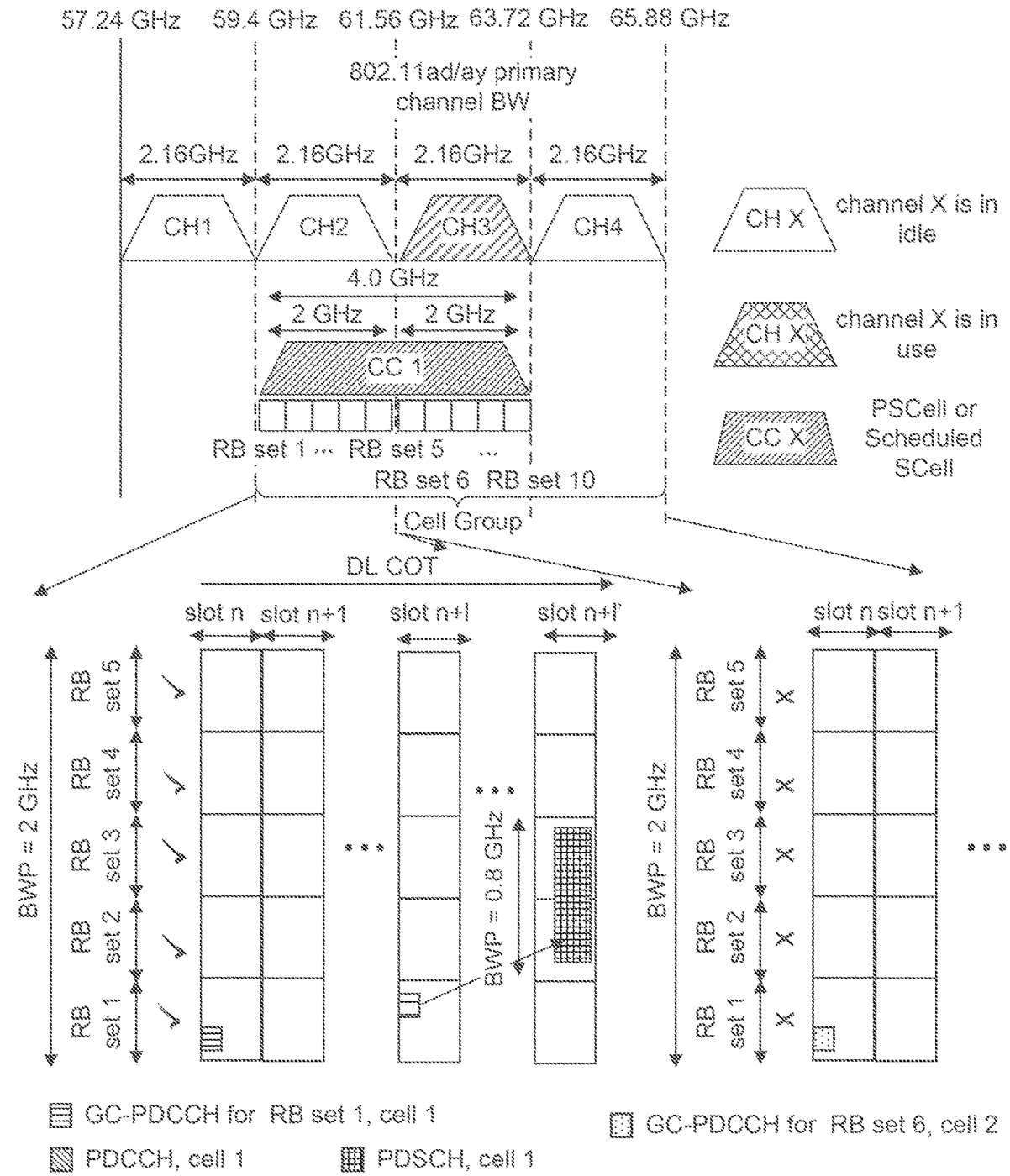
FIG. 15 illustrates an exemplary LBT results groupcast to UE with wideband operation when gNB initiate the LBT.

Another example is illustrated in FIG. 15. In this example, one CC is configured with a BW which is equal to (M=10)×B̃', e.g., 10 RB sets. In this example, the RB sets 1 to 5 are allocated in channel number 2 and the RB sets 6 to 10 are allocated in channel number 3. If the channel number 3 is used by other RAT (e.g. 802.11 ad/ay) then the RB sets 6 to 10 are blocked. However, RB set 1 can be used for a scheduling DCI and the DCI format (e.g., 2_0) when channel number 2 is available.

The disclosed subject matter for case 1, e.g., other RAT's channel BW is integer multiples of the RB set size are summarized as in the following scenarios.

In a first scenario, if a UE is configured with multiple CCs (cells) in a channel, then one CC (cell) can be configured as the scheduling cell for each channel. If a CC is used for the co-scheduling in a channel (e.g., its BW<B) and its carrier BW is integer multiples of the RB size, then the UE can be configured to monitor a DCI format (e.g., 2_0) in an RB set.

In a second scenario, if a UE is configured with a wideband BWP in a CC, e.g., the BWP's BW is integer multiples of the RB set size and the carrier/channel BW is more than the bandwidth of a channel number (e.g., B), then the UE can monitor one RB set for a DCI format (e.g., 2_0) in a channel.

If UE initiates the LBT, then UE can perform LBT for each RB set and the UE can report the LBT results using one of the following options.

Option 1: UE reports the LBT results for each RB set in a configuration. gNB can calculate the total numbers of RB sets N in a configuration. The report sequence can be based on {RB set #1, RB set #2, . . . , RB set #N}. The threshold (e.g. energy detection ED) can be configured or indicated by network.

Option 2: UE reports the LBT results for each channel. Note, the BW of a channel can be integer multiples of the RB set size. If there are multiple CCs that are configured in a channel, UE only reports the LBT results for that channel because gNB and UE know how many channels are allocated. The report sequence can be based on {CH #1, CH #2, . . . , CH #Q}, where Q is the total number of channels that are configured for a UE.

Case 2

The B̃ denote the RB set size and B̃≈B, where B is the channel BW for other RAT (e.g. 802.11 ad/ay). For example, B̃=2 GHz for the RB set size and B is 2.16 GHz. In this scenario, LBT BW can be performed over multiple RB sets or CC(s). One of special case is that LBT BW is equal to a CC BW or transmission BW.

If gNB initiates the LBT, then gNB can signal the available RB sets indication in the form of {RB set #1,RB set #2, . . . , RB set #$N_1$} for a UE.

UE can determine the total number of RB sets $N_1$ based on the configuration.

If there are multiple CCs which are within LBT BW (or an RB set), say RB set i, then the CCs within the RB set i may share the same indicator, e.g., the LBT result and COT information could apply for the CCs in the RB set i. In addition, the UE can be configured for a CC in an RB set i for co-scheduling. The DCI format (e.g., 2_0) can be monitored in the scheduling SCell (or PSCell/PCell).

If a CC's channel BW may be equal to $\tilde{B}$ or integer multiples of $\tilde{B}$, then network can partition each RB set into several sub-RB sets in the CC. The sub-RB set size $\tilde{B}'$ can be based on the expression $$\tilde{B}' = \frac{\tilde{B}}{M},$$

where M is a positive integer. UE can monitor the DCI format (e.g., 2_0) in a sub-RB set and the CORESET is configured in a sub-RB set.

If UE initiates the LBT then UE can perform LBT for each RB set and the UE can report the LBT results in the form of {RB set #1, RB set #2, ..., RB set #$N_2$}

UE can determine the total number of RB set $N_2$ based on the configuration.

If multiple CCs are within an RB set i, then UE may report an LBT result for the RB set i.

If there is a CC and its channel BW may be equal to $\tilde{B}$ or integer multiples of B and each RB set is partitioned into several sub-RB sets in the CC, the UE reports LBT results for this CC.

Figure 16:
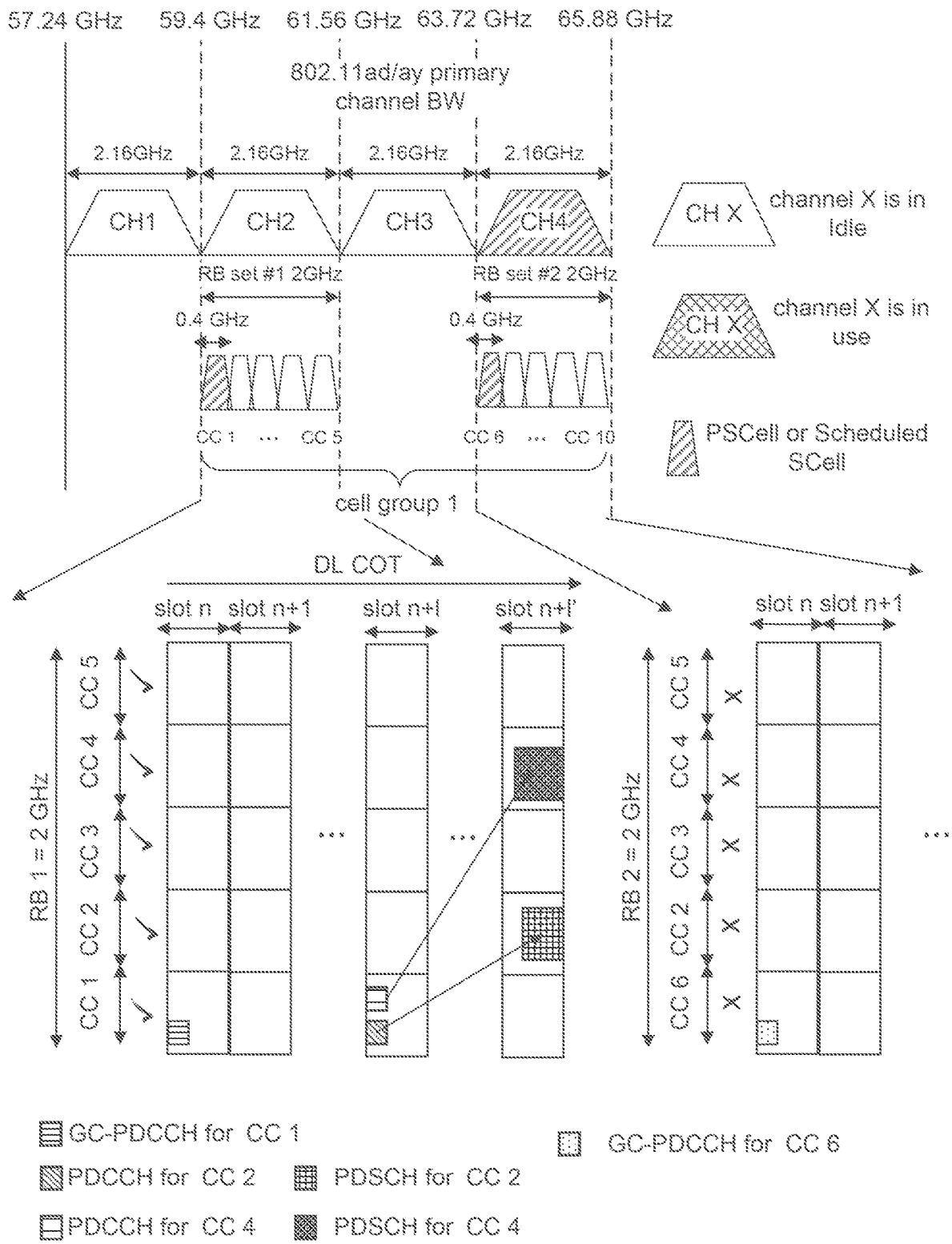
FIG. 16 illustrates an exemplary LBT results are groupcast to UE with wideband operation when gNB initiate the LBT.

For example, a UE is configured with a cell group and there are 10 CCs in the cell group as shown in FIG. 16. Each CC has channel BW $\tilde{B}'$ (e.g. 0.4 GHz) and the RB set size $\tilde{B}$ is equal to 2 GHz. In this configuration (e.g., gNB/UE performs a LBT over all CCs), UE can determine that the total number of RB sets is equal to 2 as shown in FIG. 16. This is based on the CC 1 to CC 5 are configured for a channel with the channel number 2 and CC6 to CC 10 are configured for a channel with the channel number of 4. The aggregated channel BW is equal to 4 GHz. gNB can transmit the LBT results {RB set #1, RB set #2} to a UE based on the channel availability (e.g. RB set #1 is available, but RB set #2 is not). There are 5 CCs in the RB set #1, therefore, the CCs (e.g. CC 1 to CC 5) share the same RB set and COT information. In addition, a CC in RB set #i (i=1,2) can be configured for monitoring the DCI format 2_0 to save the power consumption since only fraction of the RB set size is used for detecting the DCI format 2_0 before the UE obtains the COT and RB sets information.

In addition, further disclosed are the following methods for NR-U with co-scheduling for CA.

In a first method, for non-scheduling SCell (e.g., the SCell is not responsible for co-scheduling), it can be rapidly activated or deactivated (e.g., or transitioned in/out of dormancy behavior) via the scheduled DCI format 1_1 (non-fallback DCI) from PSCell, PCell or the scheduling SCell. The non-scheduling SCell can be configured with at least two BWPs, one BWP is for data reception and/or transmission, and the other BWP is configured as a dormancy BWP which means the BWP is configured without any search space associated with a CORESET, if configured. So, when there is no scheduled data or it is signaled to switch to the dormancy BWP via DCI format (e.g. DCI format 0_1,1_1) from PCell/PSCell/scheduling SCell, then the UE is not required to monitor any DCI for the non-scheduling SCell. When UE switches to the dormancy BWP, it can save power for not monitoring PDCCH, therefore, it behaves like deactivating the SCell. However, the true deactivation for the non-scheduling SCell is still based on MAC-CE.

In a second method, for scheduling SCell, PSCell or PCell, it can be configured with more than one BWPs as in Rel-15/16. One BWP can be set as the initial BWP if configured, otherwise, it can use the default BWP for monitoring the DCI format 2_0 when the COT and the RB sets information are not available for the UE.

Figure 19:
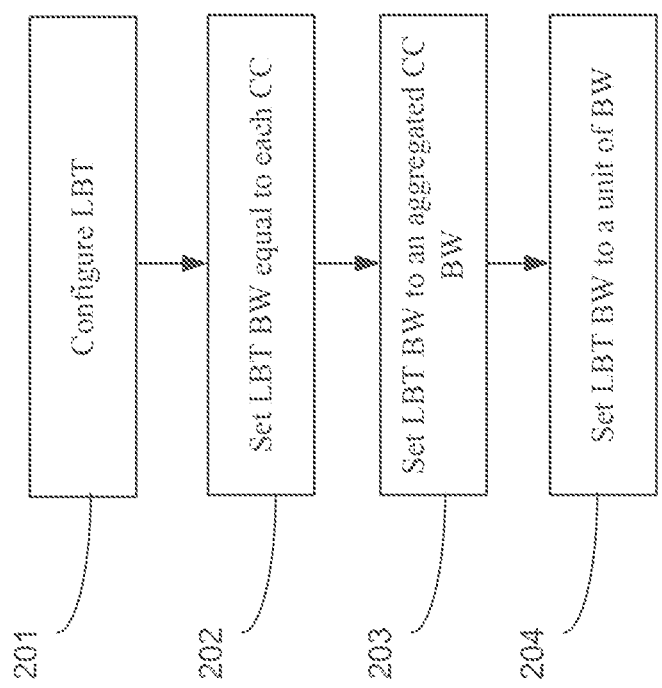
FIG. 19 illustrates an exemplary method for channelization and LBT for NR.

FIG. 19 illustrates an exemplary method for channelization and LBT for NR. At step 201, listen before talk (LBT) bandwidth (BW) may be configured for carrier aggregation or aggregated channel bandwidth within a channel bandwidth of radio access technology. At step 202, the LBT BW or a resource block (RB) set BW may be set to equal to each component carrier (CC) BW or transmission BW. At step 203, LBT BW or RB set BW may be set to an aggregated CC BW or aggregated transmission BW. At step 204, LBT BW or RB set BW set to equal to a unit of BW, in which the unit of BW may be in RBs.

It is understood that the entities performing the steps illustrated herein may be logical entities. The steps may be stored in a memory of, and executing on a processor of, a device, server, or computer system such as those illustrated in FIG. 18C or FIG. 18D. Skipping steps, combining steps, or adding steps between exemplary methods disclosed herein is contemplated. Table 7 provides exemplary abbreviation and definitions for subject matter disclosed herein.

TABLE 7

| Abbreviations and Definitions | |
|---|---|
| Abbreviations | Definitions |
| A/N | Ack/Nack |
| BRS | Beam Reference Signal |
| BWP | Bandwidth Part |
| CA | Carrier aggregation |
| CBW | Channel Bandwidth |
| CC | Component Carrier |
| CCA | Clear channel assessment |
| CE | Control Element |
| CORESET | Control Resource Set |
| COT | Channel Occupation Time |
| CRC | Cyclic Redundancy Check |
| DL | Downlink |
| DM-RS | DeModulation Reference signal |
| DRX | Discontinuous Reception |
| EDMG | Enhanced Directional Multi Gigabit |
| eMBB | enhanced Mobile Broadband |
| FFT | Fast Fourier Transform |
| FR1 | Frequency Range 1 |
| FR2 | Frequency Range 2 |
| GC-PDCCH | Group Common PDCCH |
| GNSS | Global Navigation Satellite System |
| HARQ | Hybrid Automatic Repeat Request |
| IEEE | Institute of Electrical and Electronics Engineers |
| LAA | Licensed-assisted access |
| LBT | Listen Before Talk |
| LTE | Long Term Evolution |
| MAC | Medium Access Control |
| MIB | Master Information Block |
| NACK | Negative-ACKnowledgement |
| NR | New Radio |
| NR-U | New Radio Unlicensed |
| PBCH | Physical Broadcast Channel |
| PCell | Primary Cell |
| PSCell | Primary Secondary Cell |
| PDCCH | Physical Downlink Control Channel |
| PDSCH | Physical Downlink Shared Data Channel |

TABLE 7-continued

Abbreviations and Definitions

| Abbreviations | Definitions |
|---|---|
| PRACH | Physical Random Access Channel |
| PRB | Physical Resource Block |
| PT-RS | Phase Tracking Reference Signal |
| QAM | Quadrature Amplitude Modulation |
| RAN | Radio Access Network |
| RAT | Radio Access Technology |
| RB | Resource Block |
| RNTI | Radio Network Temporary Identifier |
| RRC | Radio Resource Control |
| SBPS | Sampling Bits Per Second |
| SCell | Secondary Cell |
| SCI | Sidelink Control Information |
| SCS | Subcarrier Spacing |
| SFI | Slot Format Indicator |
| SI | System Information |
| SIB | System Information Block |
| SRS | Sounding Reference Signal |
| SSB | Synchronization Signal Block |
| STA | Station |
| TCI | Transmission Configuration Index |
| TDD | Time Division Duplex |
| UE | User Equipment |
| UL | Uplink |
| URLLC | Ultra-Reliable and Low Latency Communications |

Figure 17:
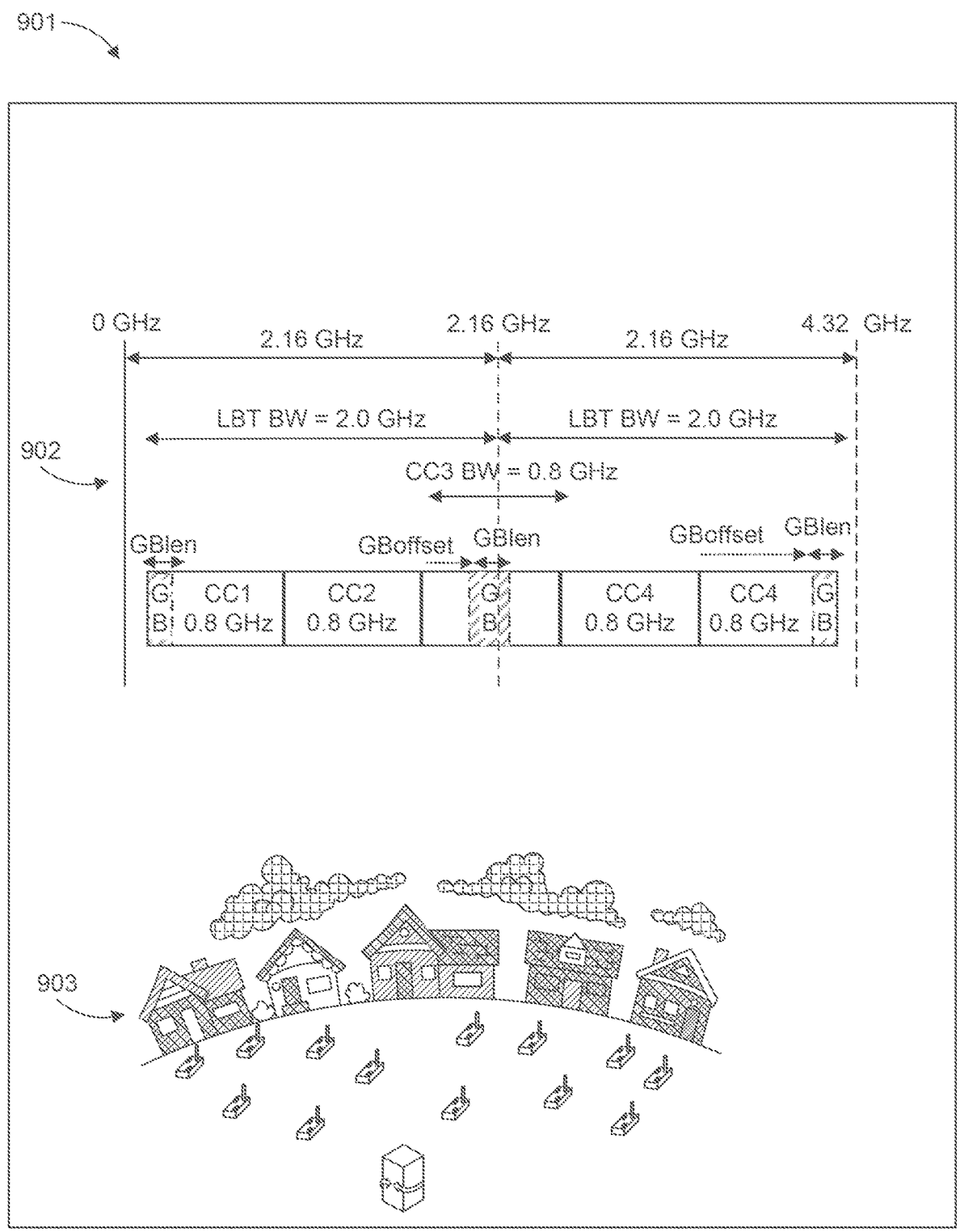
FIG. 17 illustrates an exemplary display (e.g., graphical user interface) that may be generated based on the methods, systems, and devices for channelization and LBT for NR unlicensed band from 52.6 GHz and above.

FIG. 17 illustrates an exemplary display (e.g., graphical user interface) that may be generated based on the methods, systems, and devices for channelization and LBT for NR unlicensed band from 52.6 GHz and above, as disclosed herein. Display interface 901 (e.g., touch screen display) may provide text in block 902 associated with channelization and LBT for NR unlicensed band from 52.6 GHz and above. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices for channelization and LBT for NR unlicensed band from 52.6 GHz and above, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 18A:
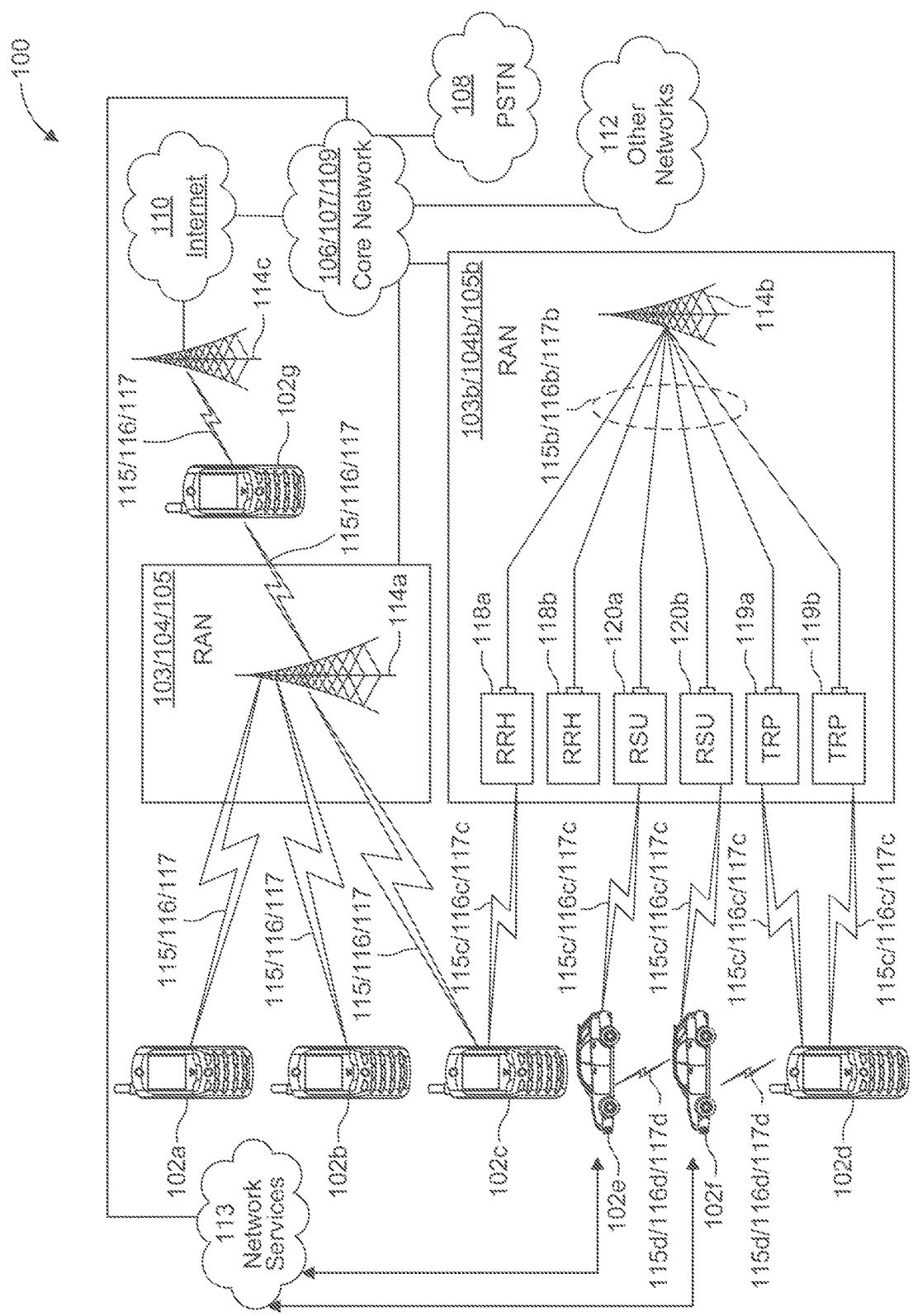
FIG. 18A illustrates an exemplary communications system.

FIG. 18A illustrates an example communications system 100 in which the methods and apparatuses for channelization and LBT for NR unlicensed band from 52.6 GHz and above, such as the systems and methods illustrated in FIG. 1 through FIG. 16 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 18A, FIG. 18B, FIG. 18C, FIG. 18D, FIG. 18E, or FIG. 18F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 18A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices for channelization and LBT for NR unlicensed band from 52.6 GHz and above, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 18A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices for channelization and LBT for NR unlicensed band from 52.6 GHz and above, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 18A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 18A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices for channelization and LBT for NR unlicensed band from 52.6 GHz and above, as disclosed herein. For example, the WTRU 102g shown in FIG. 18A may be configured to communicate with the base station 114a, which may employ a cellular-based radio technology, and with the base station 114c, which may employ an IEEE 802 radio technology.

Although not shown in FIG. 18A, it will be appreciated that a User Equipment may make a wired connection to a gateway. The gateway maybe a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115c/116c/117c may equally apply to a wired connection.

Figure 18B:
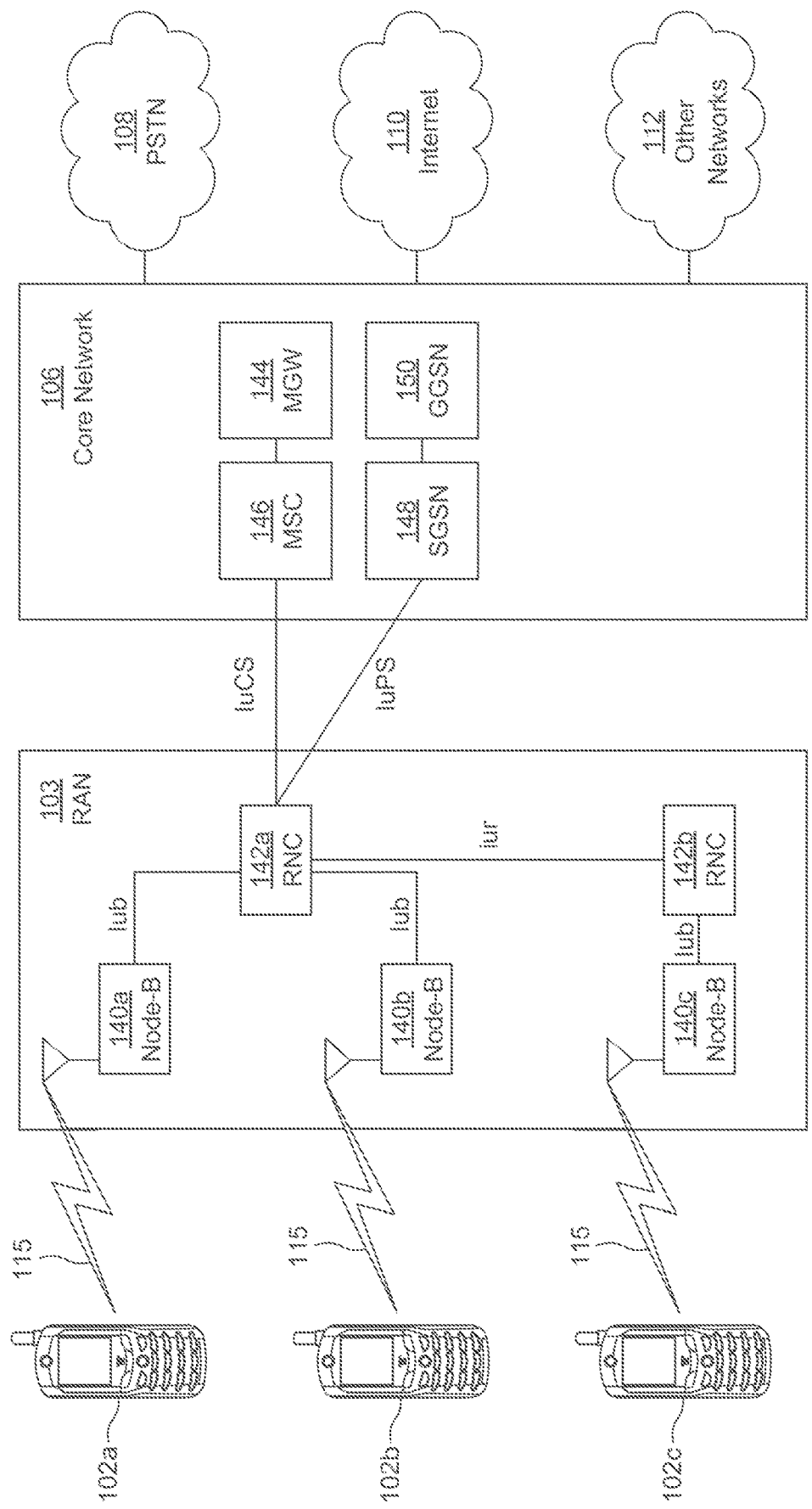
FIG. 18B illustrates an exemplary system that includes RANs and core networks.

FIG. 18B is a system diagram of an example RAN 103 and core network 106 that may implement methods, systems, and devices for channelization and LBT for NR unlicensed band from 52.6 GHz and above, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 18B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 18B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 18B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 18C:
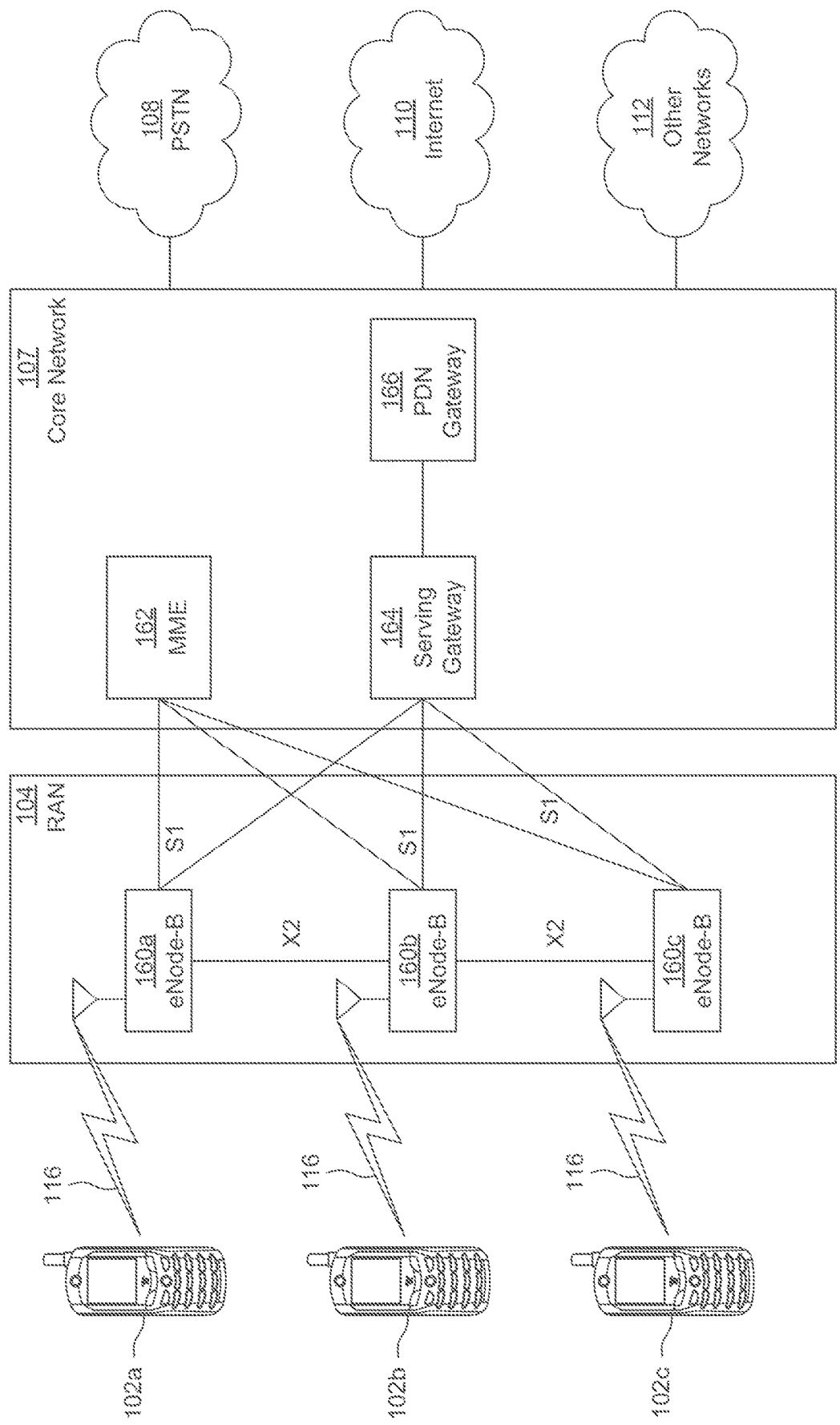
FIG. 18C illustrates an exemplary system that includes RANs and core networks.

FIG. 18C is a system diagram of an example RAN 104 and core network 107 that may implement methods, systems, and devices for channelization and LBT for NR unlicensed band from 52.6 GHz and above, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 18C, the eNode-Bs 160a, 160b, and 160c may communicate with one another over an X2 interface.

The core network 107 shown in FIG. 18C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 18D:
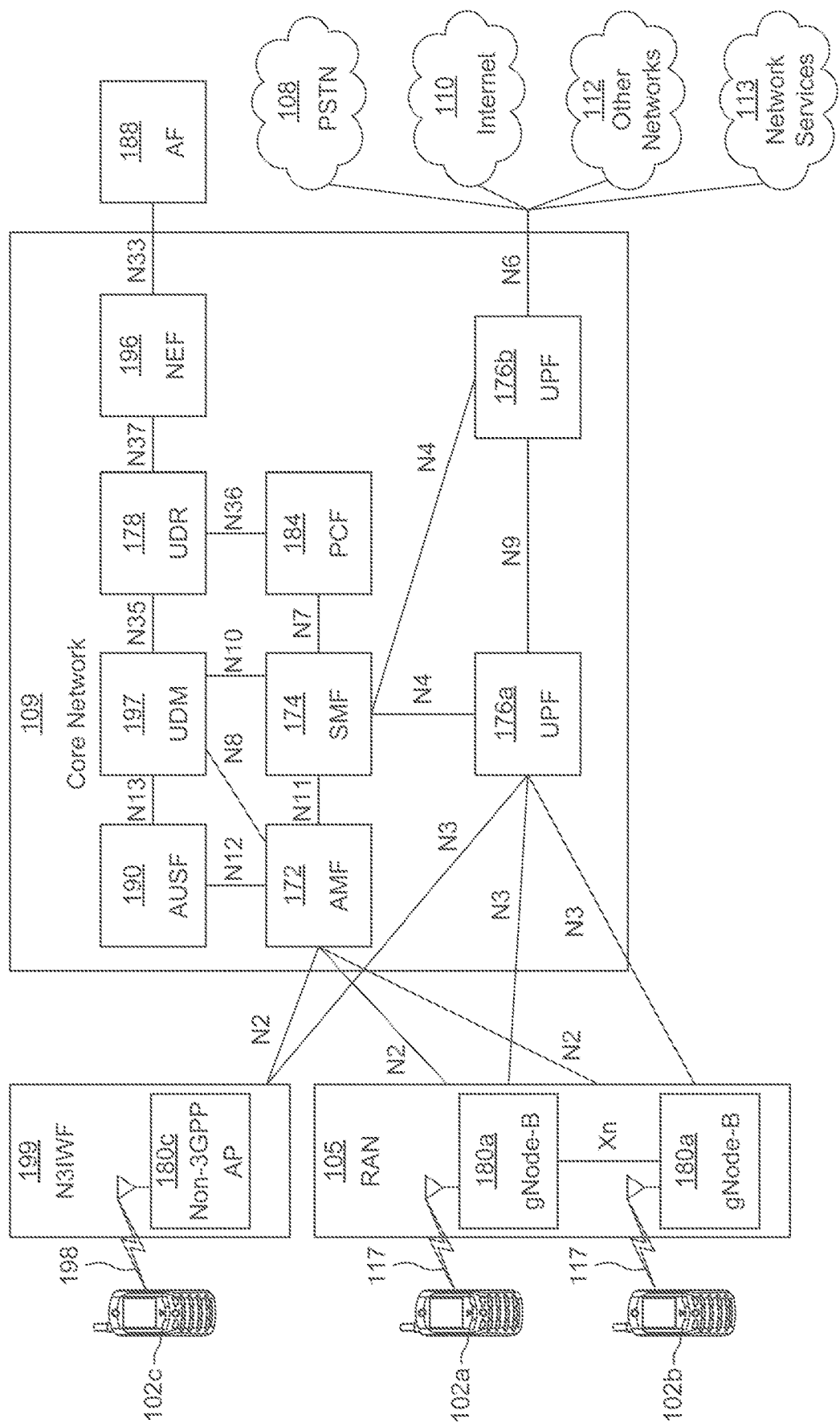
FIG. 18D illustrates an exemplary system that includes RANs and core networks.

FIG. 18D is a system diagram of an example RAN 105 and core network 109 that may implement methods, systems, and devices for channelization and LBT for NR unlicensed band from 52.6 GHz and above, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 18D, the gNode-Bs 180*a* and 180*b* may communicate with one another over an Xn interface, for example.

The core network 109 shown in FIG. 18D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 18G.

In the example of FIG. 18D, the 5G Core Network 109 may include an access and mobility management function (AMF) 172, a Session Management Function (SMF) 174, User Plane Functions (UPFs) 176*a* and 176*b*, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 18D shows that network functions directly connect with one another, however, it should be appreciated that they may communicate via routing agents such as a diameter routing agent or message buses.

In the example of FIG. 18D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102*a*, 102*b*, and 102*c* via an N1 interface. The N1 interface is not shown in FIG. 18D.

The SMF 174 may be connected to the AMF 172 via an N11 interface. Similarly the SMF may be connected to the PCF 184 via an N7 interface, and to the UPFs 176*a* and 176*b* via an N4 interface. The SMF 174 may serve as a control node. For example, the SMF 174 may be responsible for Session Management, IP address allocation for the WTRUs 102*a*, 102*b*, and 102*c*, management and configuration of traffic steering rules in the UPF 176*a* and UPF 176*b*, and generation of downlink data notifications to the AMF 172.

The UPF 176*a* and UPF 176*b* may provide the WTRUs 102*a*, 102*b*, and 102*c* with access to a Packet Data Network (PDN), such as the Internet 110, to facilitate communications between the WTRUs 102*a*, 102*b*, and 102*c* and other devices. The UPF 176*a* and UPF 176*b* may also provide the WTRUs 102*a*, 102*b*, and 102*c* with access to other types of packet data networks. For example, Other Networks 112 may be Ethernet Networks or any type of network that exchanges packets of data. The UPF 176*a* and UPF 176*b* may receive traffic steering rules from the SMF 174 via the N4 interface. The UPF 176*a* and UPF 176*b* may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102*c* and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 18D. The PCF 184 may provide policy rules to control plane nodes such as the AMF 172 and SMF 174, allowing the control plane nodes to enforce these rules. The PCF 184, may send policies to the AMF 172 for the WTRUs 102*a*, 102*b*, and 102*c* so that the AMF may deliver the policies to the WTRUs 102*a*, 102*b*, and 102*c* via an N1 interface. Policies may then be enforced, or applied, at the WTRUs 102*a*, 102*b*, and 102*c*.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 18D, in a network slicing scenario, a WTRU 102*a*, 102*b*, or 102*c* may connect with an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned or operated by other service providers.

The core network entities described herein and illustrated in FIG. 18A, FIG. 18C, FIG. 18D, or FIG. 18E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 18A, FIG. 18B, FIG. 18C, FIG. 18D, or FIG. 18E are provided by way of example only, and it is understood that the subject matter disclosed and claimed herein may be embodied or implemented in any similar communication system, whether presently defined or defined in the future.

Figure 18E:
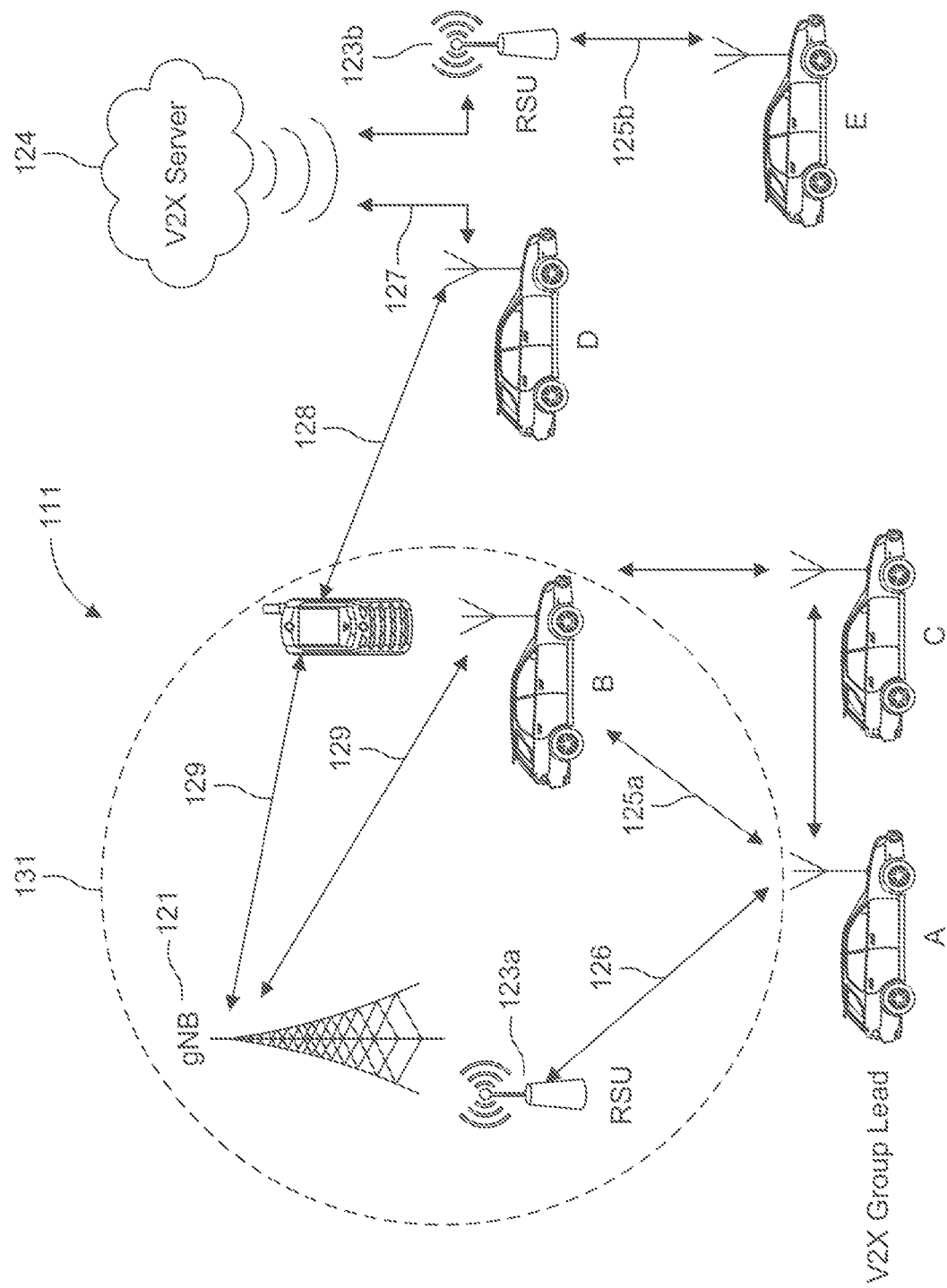
FIG. 18E illustrates another example communications system.

FIG. 18E illustrates an example communications system 111 in which the systems, methods, apparatuses that implement channelization and LBT for NR unlicensed band from 52.6 GHz and above, described herein, may be used. Communications system 111 may include Wireless Transmit/Receive Units (WTRUs) A, B, C, D, E, F, a base station gNB 121, a V2X server 124, and Road Side Units (RSUs) 123*a* and 123*b*. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 18E, WTRUs B and F are shown within access network coverage 131. WTRUs A, B, C, D, E, and F may communicate with each other directly via a Sidelink interface (e.g., PC5 or NR PC5) such as interface 125*a*, 125*b*, or 128, whether they are under the access network coverage 131 or out of the access network coverage 131. For instance, in the example of FIG. 18E, WRTU D, which is outside of the access network coverage 131, communicates with WTRU F, which is inside the coverage 131.

WTRUs A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 18F:
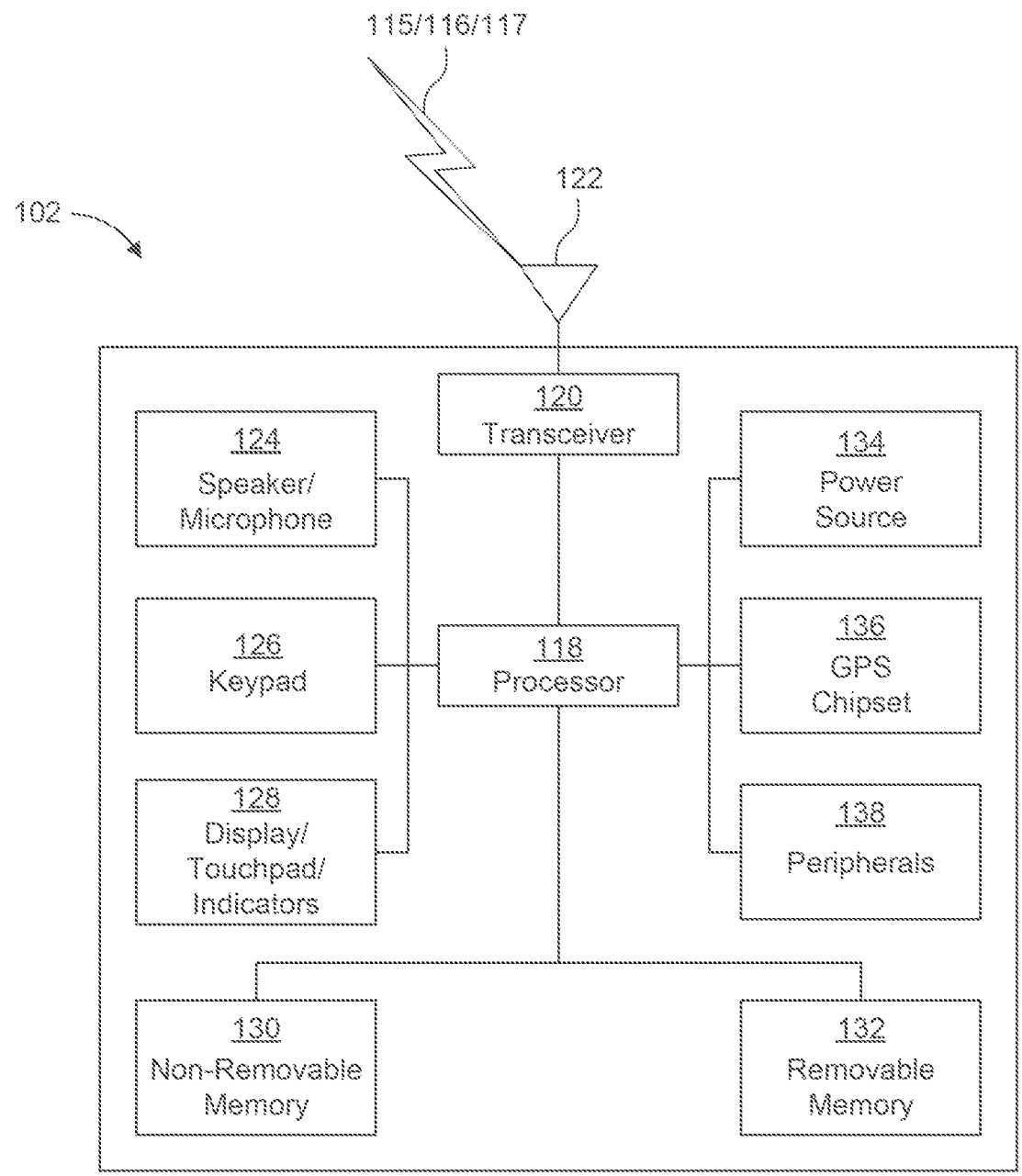
FIG. 18F is a block diagram of an example apparatus or device, such as a WTRU.

FIG. 18F is a block diagram of an example apparatus or device WTRU 102 that may be configured for wireless communications and operations in accordance with the systems, methods, and apparatuses that implement mobility signaling load reduction, described herein, such as a WTRU 102 of FIG. 18A, FIG. 18B, FIG. 18C, FIG. 18D, or FIG. 18E, or FIG. 1-FIG. 16. As shown in FIG. 18F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114*a* and 114*b*, or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 18F and may be an exemplary implementation that performs the disclosed systems and methods for channelization and LBT for NR unlicensed band from 52.6 GHz and above described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 18F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114*a* of FIG. 18A) over the air interface 115/116/117 or another UE over the air interface 115*d*/116*d*/117*d*. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 18F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the channelization and LBT for NR unlicensed band from 52.6 GHz and above in some of the examples described herein are successful or unsuccessful, or otherwise indicate a status for channelization and LBT for NR unlicensed band from 52.6 GHz and above and associated components. The control lighting patterns, images, or colors on the display or indicators 128 may be reflective of the status of any of the method flows or components in the FIG.'s illustrated or discussed herein. Disclosed herein are messages and procedures for channelization and LBT for NR unlicensed band from 52.6 GHz and above. The messages and procedures may be extended to provide interface/API for users to request resources via an input source (e.g., speaker/microphone 124, keypad 126, or display/touchpad/indicators 128) and request, configure, or query for channelization and LBT for NR unlicensed band from 52.6 GHz and above related information, among other things that may be displayed on display 128.

The processor 118 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 18G:
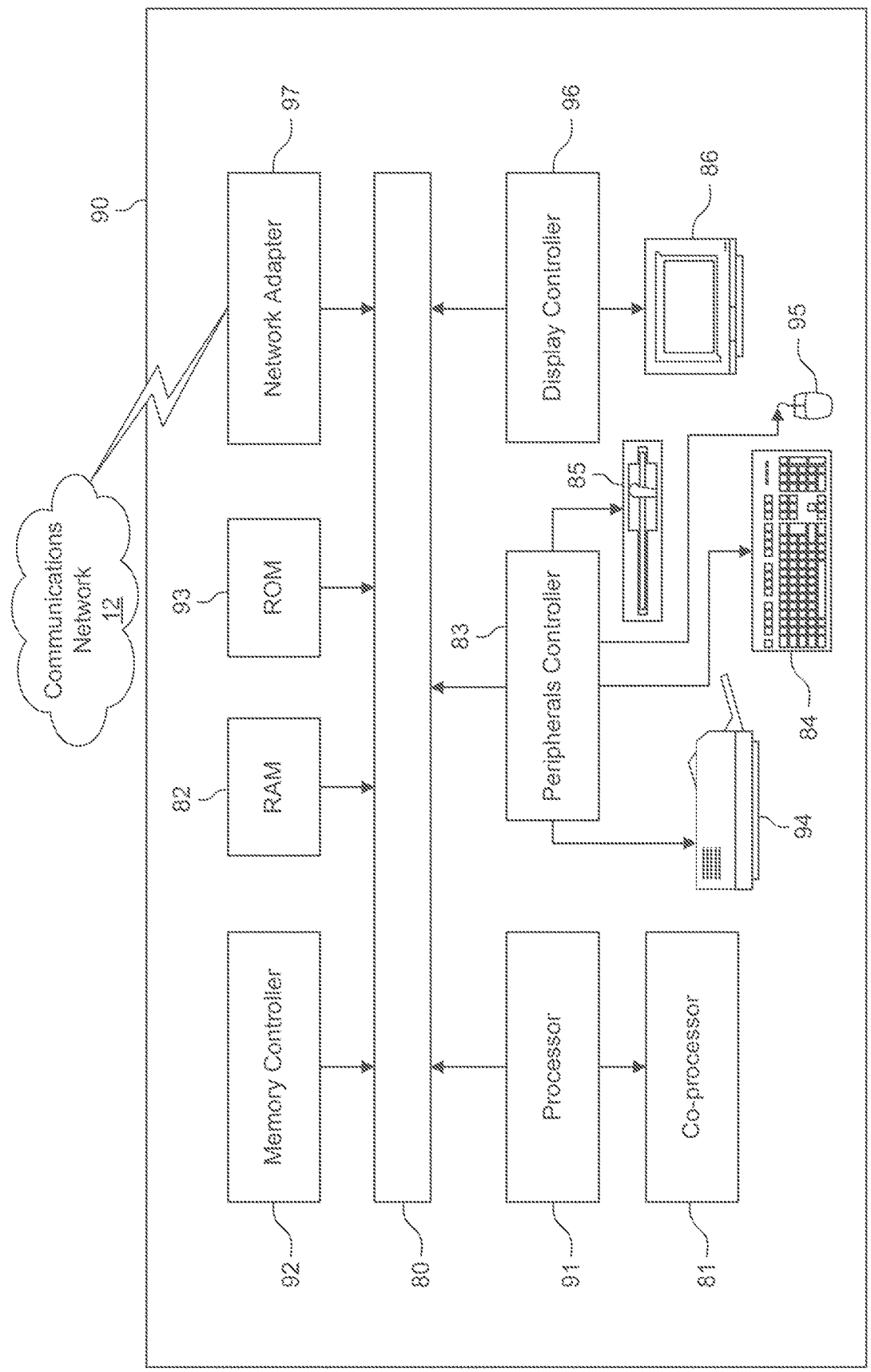
FIG. 18G is a block diagram of an exemplary computing system.

FIG. 18G is a block diagram of an exemplary computing system 90 in which one or more apparatuses of the communications networks illustrated in FIG. 18A, FIG. 18C, FIG. 18D and FIG. 18E as well as for channelization and LBT for NR unlicensed band from 52.6 GHz and above, such as the systems and methods illustrated in FIG. 1 through FIG. 16 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for channelization and LBT for NR unlicensed band from 52.6 GHz and above.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 18A, FIG. 18B, FIG. 18C, FIG. 18D, or FIG. 18E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—channelization and LBT for NR unlicensed band from 52.6 GHz and above—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for ways for channelization and LBT for NR unlicensed band from 52.6 GHz and above. A method, system, computer readable storage medium, or apparatus may provide for configuring carrier aggregation or aggregated channel bandwidth that is aligned with integer multiples of other RAT's channel bandwidth B (e.g. 2.16) GHz. A method, system, computer readable storage medium, or apparatus may provide for configuring carrier aggregation or reused legacy NR channel BW or aggregated channel bandwidth that are not aligned with integer multiples of other RAT's channel bandwidth B (e.g. 2.16) GHz. A method, system, computer readable storage medium, or apparatus may provide for configuring LBT and COT sharing schemes when other RAT's channel BW (e.g. B) is integer multiples of the RB set size e.g., the bandwidth of LBT for NR-U from 52.6 to 71 GHz and above. A method, system, computer readable storage medium, or apparatus may provide for configuring LBT and COT sharing schemes when other RAT's channel BW is (almost) equal to the RB set size for NR-U from 52.6 GHz to 71 GHz. The (almost equal to B) BW $\tilde{B}$ means the maximum supported channel bandwidth within B. Methods, systems, and apparatuses, among other things, as described herein may provide for ways for configuring listen before talk (LBT) bandwidth (BW) for carrier aggregation or aggregated channel bandwidth within RAT's channel bandwidth; LBT or resource block (RB) set BW can be set (e.g., configured) to equal to each component carrier (CC) BW or transmission BW, gNB or user equipment (UE) can perform LBT for each CC; LBT or RB set BW can be set to the aggregated CC BW or aggregated transmission BW, in which gNB or UE can perform a LBT over multiple/aggregated CC; and LBT or RB set BW can be configured or set to be equal to a unit of BW (e.g., in terms of RBs), in which gNB or UE performs LBT across all the units in the channel bandwidth in each CC. See for example, FIG. 8A, FIG. 9A, FIG. 11A, or FIG. 19. All combinations in this paragraph and the below (including the removal or addition of steps) are contemplated in a manner that is consistent with the other portions of the detailed description.

A method, system, computer readable storage medium, or apparatus may provide for configuring listen before talk (LBT) bandwidth (BW) and channel occupation time (COT) sharing schemes when co-exist other radio access technology's (RAT's) channel BW (e.g. B) for NR-U from 52.6 to 71 GHz and above; when LBT or a RB set BW is set to equal to each CC BW or transmission BW, gNB or UE can perform LBT for each CC, PCell, PSCell or a scheduling SCell can co-schedule LBT results for other CC; when LBT or a RB set BW is set to equal to each CC BW or transmission BW, gNB or UE can perform LBT for each CC, LBT result for each CC can be independently scheduled for each activated CC; when LBT or a RB set BW is set to the aggregated CC BW or aggregated transmission BW, gNB or UE performs a LBT across multiple/aggregated CC or the LBT result is duplicated over all CCs and is transmitted on PCell, PSCell or a scheduling SCell; or when LBT or RB set BW is set a unit (e.g., in terms of RBs), gNB or UE performs LBT across all the units in the channel bandwidth in each CC or LBT results can be transmitted in a RB set in a CC. A method, system, computer readable storage medium, or apparatus may provide for configuring listen before talk (LBT) bandwidth (BW) for carrier aggregation or configuring aggregated channel bandwidth within a channel band-width of radio access technology; or setting the LBT BW or a resource block (RB) set BW equal to each component carrier (CC) BW or transmission BW. A method, system, computer readable storage medium, or apparatus may provide for configuring listen before talk (LBT) bandwidth (BW) for carrier aggregation or configuring aggregated channel bandwidth within a channel bandwidth of radio access technology; or setting LBT BW or RB set BW to an aggregated CC BW or aggregated transmission BW. A method, system, computer readable storage medium, or apparatus may provide for configuring listen before talk (LBT) bandwidth (BW) for carrier aggregation or configuring aggregated channel bandwidth within a channel bandwidth of radio access technology; or setting LBT BW or RB set BW equal to a unit of BW. All combinations in this paragraph and the above (including the removal or addition of steps) are contemplated in a manner that is consistent with the other portions of the detailed description.

What is claimed is:

1. A base station comprising: a processor configured to: receive information from a wireless transmit/receive unit (WTRU), wherein the information is used to determine listen before talk (LBT) configuration for carrier aggregation; based on the information, determine the LBT configuration for carrier aggregation, wherein the LBT configuration indicates a plurality of LBT bandwidths, each LBT bandwidth of the plurality of LBT bandwidths corresponding to a subset of component carriers (CCs) of a plurality of CCs, and each LBT bandwidth is used to perform a single LBT for a respective subset of CCs; send an indication to the WTRU, wherein the indication indicates each LBT bandwidth to perform the single LBT for the respective subset of CCs; and perform the single LBT for the respective subset of CCs based on the LBT configuration.

2. The base station of claim 1, wherein the plurality of CCs are included in a first cell group of a plurality of cell groups, wherein each CC of the plurality of component carriers of the first cell group share a same resource block set channel occupation time (COT) information.

3. The base station of claim 1, wherein each LBT bandwidth of the plurality of LBT bandwidths is indicated by one or more guardbands.

4. The base station of claim 1, wherein the single LBT is for a first cell group of a plurality of cell groups, wherein each cell group of the plurality of cell groups comprises the plurality of component carriers and a respective single LBT.

5. The base station of claim 1, wherein the information comprises WTRU capability information, and wherein the processor is configured to group one or more CCs based on the WTRU capability information to determine each respective subset of CCs.

6. The base station of claim 1, wherein the carrier aggregation comprises intra-band non-contiguous carrier aggregation.

7. The base station of claim 1, wherein the WTRU is configured with an activated bandwidth part (BWP).

8. The base station of claim 1, wherein the indication is sent via radio resource control (RRC) signaling.

9. A method performed by a base station, the method comprising:
receiving information from a wireless transmit/receive unit (WTRU), wherein the information is used to determine listen before talk (LBT) configuration for carrier aggregation;
based on the information, determining the LBT configuration for carrier aggregation, wherein the LBT configuration indicates a plurality of LBT bandwidths, each LBT bandwidth of the plurality of LBT bandwidths corresponding to a subset of component carriers (CCs) of a plurality of CCs;
sending an indication to the WTRU, wherein the indication indicates each LBT bandwidth to perform the single LBT for the respective subset of CCs; and performing the single LBT for the respective subset of CCs based on the LBT configuration.

10. The method of claim 9, wherein the plurality of CCs are included in a first cell group of a plurality of cell groups, wherein each CC of the plurality of component carriers of the first cell group share a same resource block set channel occupation time (COT) information.

11. The method of claim 9, wherein each LBT bandwidth of the plurality of LBT bandwidths is indicated by one or more guardbands.

12. The method of claim 9, wherein the single LBT is for a first cell group of a plurality of cell groups, wherein each cell group of the plurality of cell groups comprises a plurality of component carriers and a respective single LBT.

13. The method of claim 9, wherein the carrier aggregation comprises intra-band non-contiguous carrier aggregation.

14. The method of claim 9, wherein the WTRU is configured with an activated bandwidth part (BWP).

15. The method of claim 9, wherein the information comprises WTRU capability information, and wherein the method further comprising determining grouping one or more CCs based on the WTRU capability information to determine each respective subset of CCs.

16. A wireless transmit/receive unit (WTRU) comprising: a processor configured to: send information associated with the WTRU to a base station; receive an indication from the base station, wherein the indication indicates a listen before talk (LBT) configuration of LBT bandwidth for carrier aggregation to perform a single LBT for each component carrier (CC) of a plurality of CCs; and based on the LBT configuration information, determine LBT configuration for carrier aggregation, and perform the single LBT for a respective subset of CCs.

17. The WTRU of claim 16, wherein the carrier aggregation comprises intra-band non-contiguous carrier aggregation.

18. The WTRU of claim 16, wherein the WTRU is configured with an activated bandwidth part (BWP).

19. The WTRU of claim 16, wherein the LBT bandwidth for the carrier aggregation is indicated by one or more guardbands.

20. The WTRU of claim 16, wherein the WTRU indication is received via radio resource control (RRC) signaling.

21. The WTRU of claim 16, wherein the plurality of CCs are included in a first cell group of a plurality of cell groups, wherein each CC of the plurality of component carriers of the first cell group share a same resource block set channel occupation time (COT) information.

22. A method performed by a wireless transmit/receive unit (WTRU), the method comprising: sending information associated with the WTRU to a base station, wherein the information is used to determine listen before talk (LBT) configuration for carrier aggregation; receiving an indication from the base station, wherein the indication indicates the LBT configuration, wherein the LBT configuration indicates a plurality of LBT bandwidths, each LBT bandwidth of the plurality of LBT bandwidths corresponding to a subset of component carriers (CCs) of a plurality of CCs, and each LBT bandwidth is used to perform a single LBT for a respective subset of CCs; and based on the LBT configuration information, determining LBT configuration for carrier aggregation, and performing the single LBT for a respective subset of CCs.

23. The method of claim 22, wherein the plurality of CCs are included in a first cell group of a plurality of cell groups, wherein each CC of the plurality of CCs of the first cell group share a same resource block set channel occupation time (COT) information.

24. The method of claim 22, wherein each LBT bandwidth of the plurality of LBT bandwidths is indicated by one or more guardbands.

25. The method of claim 22, wherein the single LBT is for a first cell group of a plurality of cell groups, wherein each cell group of the plurality of cell groups comprises the plurality of CCs and a respective single LBT.

26. The method of claim 22, wherein the information comprises WTRU capability information, and wherein each respective subset of CCs is configured to be determined based on a grouping of one or more CCs, wherein the grouping is configured to be determined based on the WTRU capability information.

27. The method of claim 22, wherein the carrier aggregation comprises intra-band non-contiguous carrier aggregation.

28. The method of claim 22, wherein the WTRU is configured with an active bandwidth part (BWP).

29. The method of claim 22, wherein the indication is received via radio resource control (RRC) signaling.

* * * * *